United States Patent [19]

Saligny

[11] 4,210,375
[45] Jul. 1, 1980

[54] CONNECTING UNIT FOR DISPATCHERS SYSTEMS

[75] Inventor: Yves Saligny, Cluses, France

[73] Assignee: Etablissements Carpano & Pons, France

[21] Appl. No.: 955,226

[22] Filed: Oct. 27, 1978

[30] Foreign Application Priority Data

Oct. 28, 1977 [FR] France .................................. 77 33668
Oct. 5, 1978 [FR] France .................................. 78 288141

[51] Int. Cl.² .......................................... H01R 3/06
[52] U.S. Cl. ............................. 339/14 L; 339/17CF; 339/99 R
[58] Field of Search .............. 339/14 L, 14 R, 17 CF, 339/18 R, 99 R

[56] References Cited

U.S. PATENT DOCUMENTS 3,223,956 12/1965 Dufendach et al. ............... 339/14 R
3,671,812 6/1972 Peluso et al. ................ 339/17 CF X

*Primary Examiner*—Roy Lake
*Assistant Examiner*—DeWalden W. Jones

*Attorney, Agent, or Firm*—Robert E. Burns; Emmanuel J. Lobato; Bruce L. Adams

[57] ABSTRACT

This connecting unit for dispatchers systems comprises means for connecting a predetermined number of line wires.

It comprises stacked pairs of insulating supports 1, 2 kept in spaced relationship to each other by means of ribs extending from one face of a support, in each pair. The face 1' of insulating support 1 carries for example a conductor 11 of which a first end constitutes an input E1 and the second end is bent at Eb1. Similarly, the face 2' of insulating support 2 carries a corresponding conductor 21 of which a first end constitutes an output S 1 and a second end is welded at Sb 1 in front of Eb1. The bent end Eb1, in the inoperative position, bears against a portion 43 of a ground circuit 40. A module may be plugged in between the insulating supports 1 and 2 for co-operating with Eb1, Sb1 and portion 43. It may also co-operate with contact blades 42 and 51 connected to ground and signal circuits, respectively, provided on the insulating supports 1 and 2. The unit is intended more particularly for systems in which a great number of line wires have to be connected within a relatively reduced volume.

29 Claims, 38 Drawing Figures

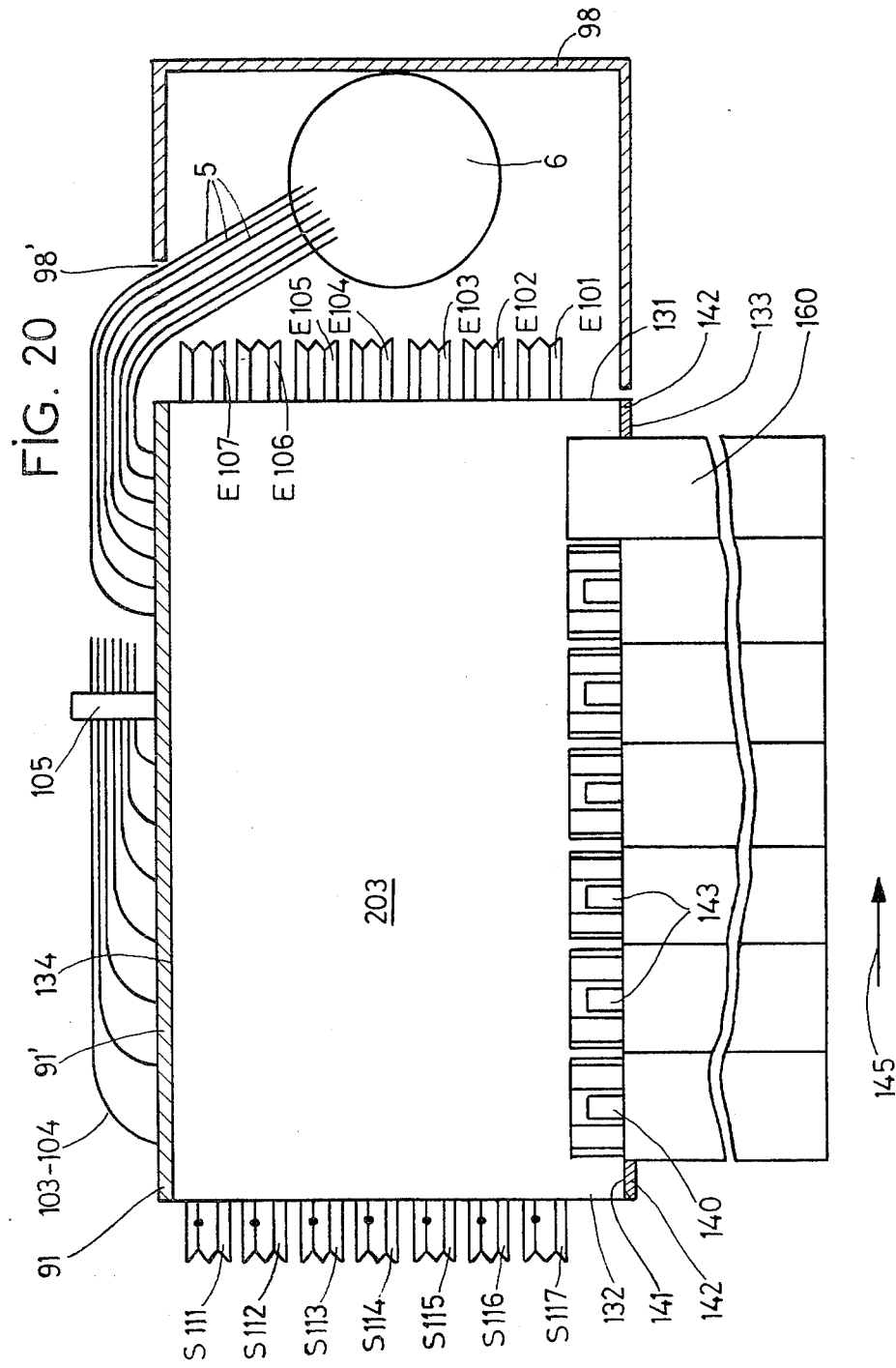

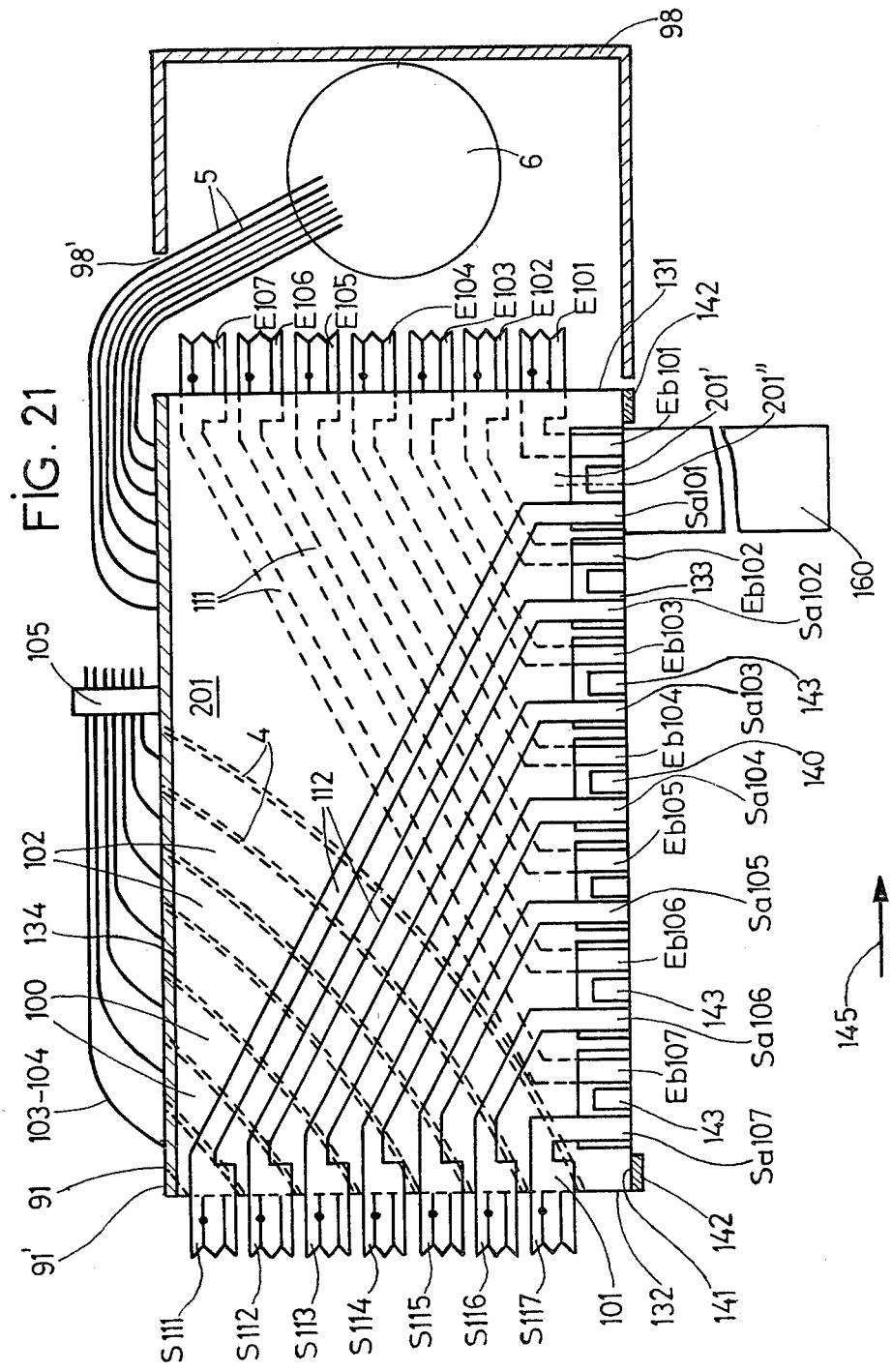

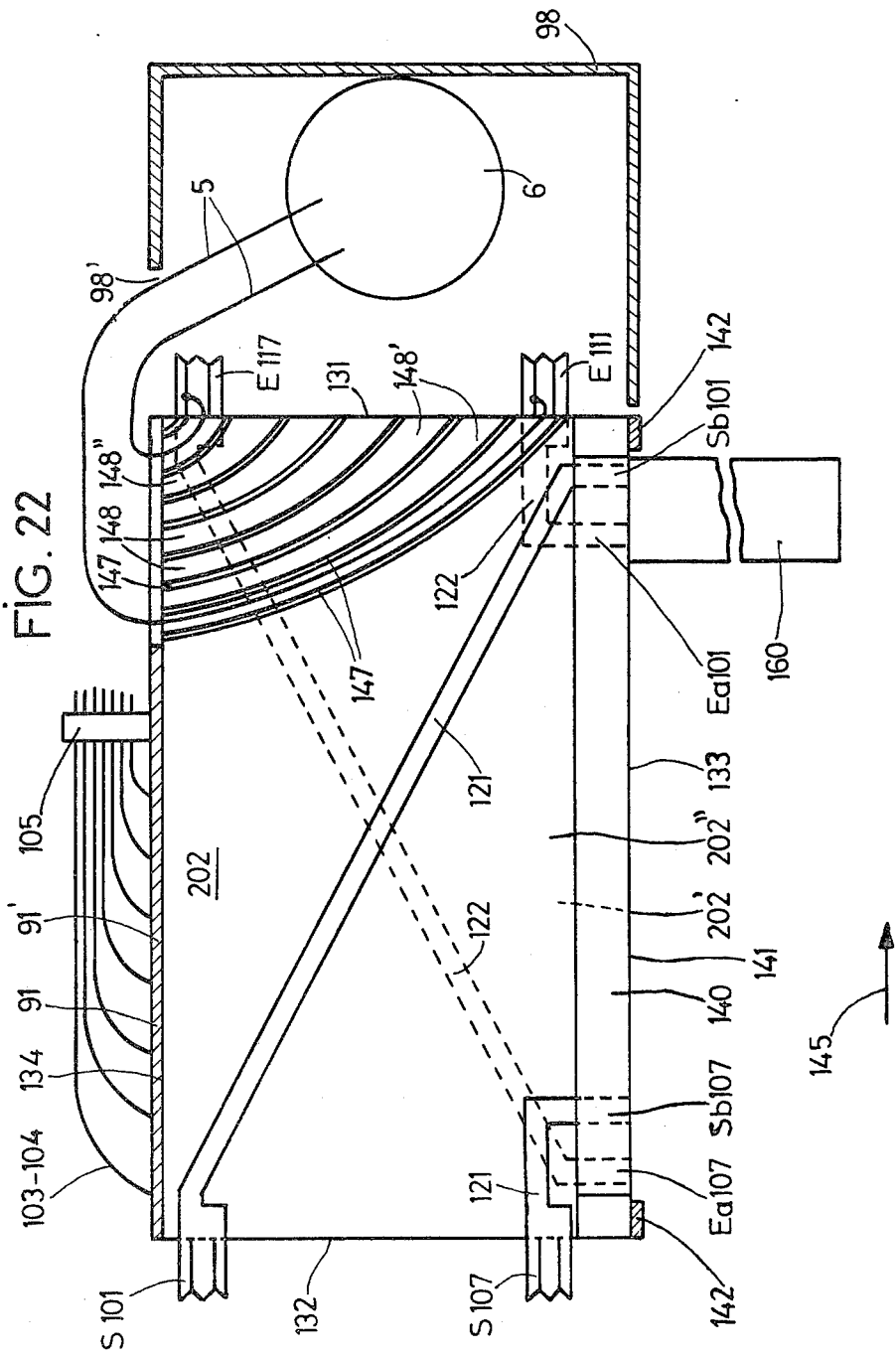

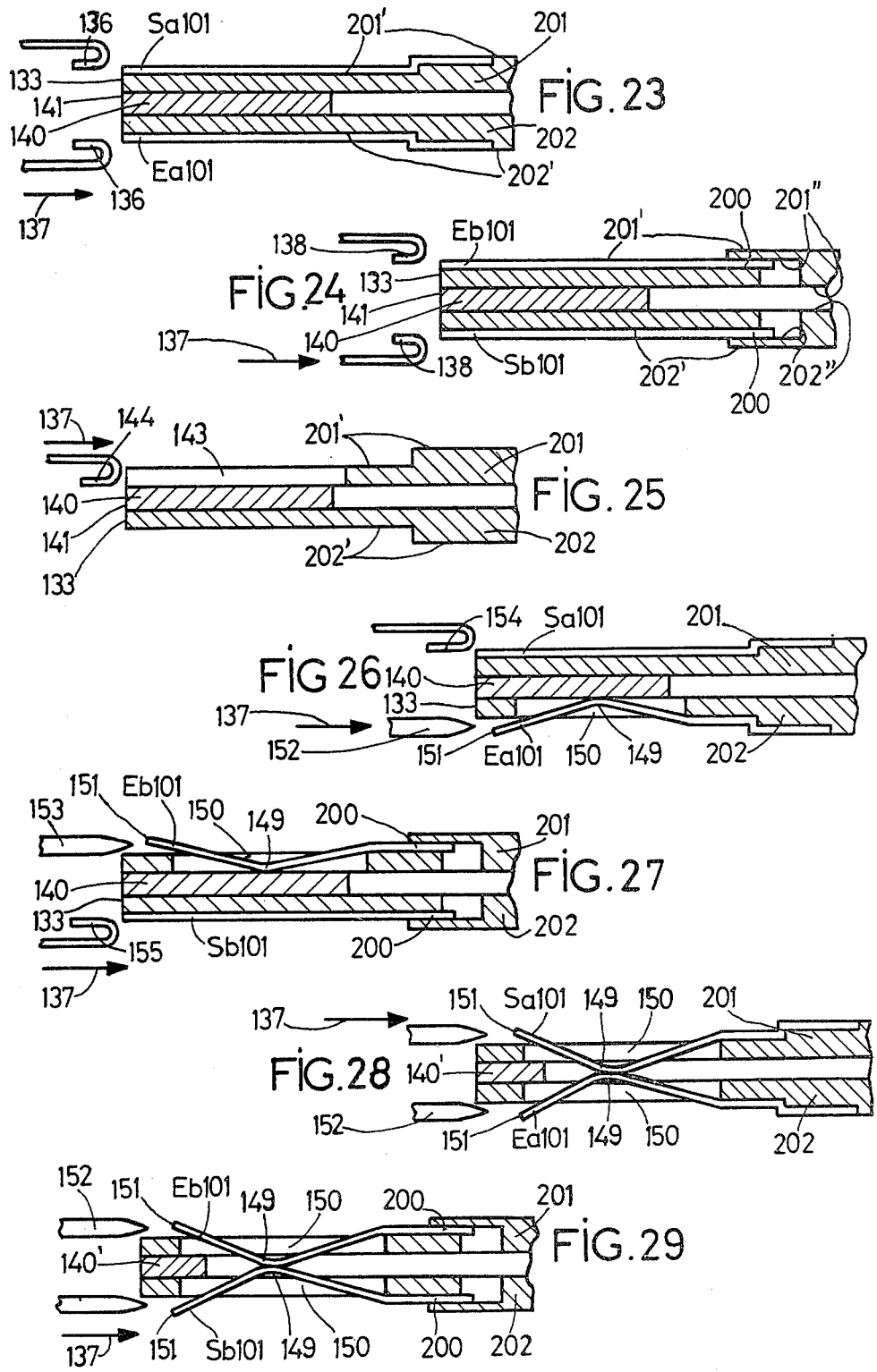

CONNECTING UNIT FOR DISPATCHERS SYSTEMS

FIELD OF THE INVENTION

The present invention relates to connecting units for dispatchers systems, comprising means for connecting a predetermined number of line wires, which means consist, for each line wire, of first and second pre-shaped conducting elements detachably mounted on stacked insulating supports. The first end of the first pre-shaped conducting element is connected to an input terminal, or constitutes itself said input terminal; the first end of the second pre-shaped conducting element is connected to an output terminal, or constitutes itself said output terminal. The second ends of the two pre-shaped conducting elements are adapted to cooperate with each other either directly or through the medium of a "function" and/or "protection" module. A ground circuit may be provided, and if such ground circuit is provided it cooperates with some of the second ends of the first pre-shaped conducting elements. In the present invention, a so-called "protection" module is a plug-in module containing protection means such as fuses or lightning arresters, for at least the two wires of a same line. On the other hand, a so-called "function" module is a plug-in module containing means for closing or opening the circuits of at least two wires of a line, according as said circuits, in the absence of the module, are open or closed respectively.

DESCRIPTION OF THE PRIOR ART

In known connecting units of this character, such as those disclosed in the French Patent Application No. 2.345.043, which is a dispatching strip, the input terminals are disposed on the rear face of the unit with respect to the operator, with the modules on the front face and the output terminals on the two lateral faces; moreover, these output terminals are set at an angle of 45° towards the front in order to facilitate to a certain extent the connection of the junction or connecting jumpers. However it appeared that this operation is delicate though the lateral output terminals have the shape of wrapper pins, on which the jumpers are to be wound. The use of self-stripping terminals is rather delicate for it is extremely difficult to connect jumpers on such terminals set at 45°. In addition, when such self-stripping terminals are used, it is advantageous thought not compulsory to provide channels or groove in close vicinity of the input and/or output terminals for guiding the connecting wires and preventing them from being torn out accidentally from their terminals. Now, considering the arrangement of the terminals in this known dispatching strip, it would not be possible to add such channels or grooves without unduly increasing the thickness of the strip-forming insulating supports and consequently the over-all dimensions of this strip. Besides, no means are provided for converting this strip into a protection block or unit for a cable head or end, this conversion requiring the provision of a ground circuit not contemplated in the strip of the prior art, inasmuch as such additional circuit means could not be incorporated without bringing very important modifications in the structure of the device, which would further increase the over-all dimensions thereof.

In other known connecting units of this type, notably as disclosed in the French Patent No. 2.309.061, the first end portions, respectively, of the two pre-shaped conducting elements contemplated for each line wire are bent at right angles to the other portions of these elements and to the corresponding insulating supports, in order to co-act with the corresponding input and output terminals having the same orientation. Similarly, the other ends of the same two pre-shaped conducting elements are folded at right angles with respect to the remaining portions of said elements and to the corresponding insulating supports, in order to co-operate with the terminals of the "function" and/or "protection" modules. The longitudinal axis of the modules is thus disposed parallel to the longitudinal axes of the input and output terminals, so that these terminals must be disposed either on the same face of the stacked insulating supports as the modules, or on the opposite face, or alternatively the ones on the same faces of the stack as the modules, and the others on the opposite face. To afford a sufficient accessibility, at least the modules and the output terminals should be disposed side by side on the same face of the stacked insulating supports, this solution leading to relatively large dimensions for said face, hence to a relatively detrimental increment in the connecting unit dimensions.

SUMMARY OF THE INVENTION

It is the primary object of this invention to provide a connecting unit or block adapted to be used notably both as a dispatcher strip and as a protection unit for cable ends, the change from one application to the other being obtained by simply adding the ground circuit, without requiring any other important modification in the general structure of the device, the various applications mentioned in the foregoing being possible while preserving relatively moderate over-all dimensions, a simple structure and a terminal layout, notably for the output terminals, affording a good accessibility and possibly the use of self-stripping terminals, with the further possibility of adding if necessary connecting wire guide channels without appreciably increasing the volume of the assembly.

To this end, the connecting unit according to the present invention is characterized in that the input terminals and the output terminals are disposed on two end sides, substantially opposite to each other, of the insulating supports, the other ends of the pre-shaped conducting elements being disposed at least substantially along a third side secant to the first two sides of said insulating supports.

An additional advantage characterizing the connecting unit according to the present invention is that, when modified versions and arrangements of the pre-shaped conducting elements are used, and when no module is plugged-in in the unit, it is possible to obtain either the disconnection or switching-out of the two wires of a line between the input terminals and the corresponding output terminals, or the grounding of the two relevant input terminals of the two wires of a line, or alternatively the electrical continuity between the input terminals and the corresponding output terminals of the two wires of a line, or furthermore the looping of the input terminals and the looping of the output terminals of the two wires of a line, possibly in combination with the grounding of the input terminals.

The connecting unit according to a first form of embodiment of the present invention comprises stacked insulating supports co-operating by pairs. The insulating supports constituting each one of said pairs are kept at a proper distance from each other and comprise first faces opposite to each other and second faces opposite to said first faces, and registering with each other in face-to-face relationship, respectively. The first and second pre-shaped conducting elements of a same line wire are disposed either both on the first face of either of the two insulating supports constituting one pair of said supports, or one on the first face of the second insulating support of one of the same pair of supports. The second ends of the two pre-shaped conducting elements corresponding to the same line wire, respectively, are bent to an angle of about 180°, generally in the range of 160° to 180° towards the second face of their corresponding insulating supports, and housed in the gap provided between the relevant second faces of the two insulating supports constituting a pair of supports. The input terminals and the output terminals are disposed on two endmost, substantially opposite to each other, of the insulating supports, respectively. The other bent ends of the pre-shaped conducting elements are disposed along or substantially along a third side secant to the first two sides of said insulating supports. An insulating element is disposed between the first pre-shaped conducting elements and the second pre-shaped conducting elements supported by each insulating support. In certain forms of embodiment, the connecting unit comprises ground circuit portions each disposed against the second face of one of the insulating supports constituting each pair of supports. Each ground circuit portion comprises extensions disposed on said other or second face, and/or extensions bent at an angle of about 180° towards the first face of the same insulating support, and/or extensions bent towards the second face of the other insulating support constituting the same pair of supports, the end portion of said last-mentioned extensions being substantially level with said second face of the other insulating support, and substantially parallel thereto. In other possible forms of embodiment, the connecting unit has no ground circuit.

According to certains forms of embodiment incorporating a ground circuit, the connecting unit of the present invention comprises a complementary, so-called signal conducting circuit disposed against the second face of the insulating support of each pair which does not carry this ground circuit. This signal circuit comprises extensions bent at an angle of about 180° towards the first face of the same insulating support. These bent extensions register respectively with the bent extensions of the ground circuit. Each pair of bent extensions registering with each other is adapted to co-operate with a pair of terminals of a protection module comprising means for detecting the faulty condition of the protection means contained in said module. This device is adapted to interconnect the two terminals in case such faulty condition existed in said protection means. Moreover, one portion of each signal circuit is adapted to contact a terminal of a plug-in signal module adapted to be plugged-in in the same plug-in plane as the protection and/or function modules, that is, in a direction substantially parallel or perpendicular to the plug-in direction of said modules. This signal module carries signal or tell-tale means connected in series between the terminal of said module and a source of current.

Besides, the various forms of embodiment of the connecting unit according to this invention comprise, in the gap provided between the two stacked insulating supports constituting a pair of said supports, one or a plurality of channels disposed side by side and opening at a first end in close vicinity of the output terminals of the two insulating supports, and at their second end on a fourth side of said insulating supports which is substantially opposite to said third side; said channel or channels may be formed either in one or the other of insulating supports constituting said pair of supports, or in at least one insert or intercalary element disposed between said pair of insulating support. According to an advantageous form of embodiment, the connecting unit is so oriented that the insulating supports constituting same are stacked vertically, the output terminals of the unit facing the operator who has to make the necessary connections, the input terminals being directed in opposition with respect to the output terminals, so that the modules are disposed laterally on one or the other side of the unit. The connecting unit according to this invention is advantageously but not compulsorily mounted for pivoting movement about an axis parallel to the direction of stacking of its support elements, this axis being substantially close to the fourth side of the insulating supports, between the endmost side of the insulating support on which the input terminals are located, and the second end of the channel nearest to said endmost side. Preferably, the connecting unit is adapted to pivot in a direction such that its function and/or protection modules will tend to lie in front of the operator, after this pivotal movement.

According to another form of embodiment of the connecting unit constituting the subject-matter of the present invention, the third side of the insulating supports, which supports the function and/or protection modules, is disposed in front of the operator, and the endmost sides of said insulating supports, which support the input terminals and the output terminals, respectively, are disposed laterally, on either side of said connecting unit.

According to another form of embodiment of the present invention, the connecting unit comprises a plurality of stacked insulating supports co-operating by pairs. The insulating supports constituting each pair are kept at regular intervals from each other and comprise first faces opposite to each other and second faces opposite to the first faces. The first and second pre-shaped conducting elements of a same line wire are disposed either on a common and single insulating support, one on a first face, and the other on the second face, of said support, or one on one face of said support and the other on one of the faces of the other support.

According to a modified embodiment, the second ends respectively of the two pre-shaped conducting elements corresponding to a same line wire are bent to an angle of about 180° towards the second faces of their relevant insulating supports and housed in the space provided between the second faces, respectively, of the two insulating supports constituting one pair of supports. According to another modified structure, the second ends respectively of said pre-shaped conducting elements corresponding to a same line wire are not bent to an angle of 180° but only discontinued in close proximity of the third side of the insulating supports which is secant to the first two insulating supports carrying the input terminals and the output terminals, respectively.

According to a modified form of embodiment and to modified versions of the second form of embodiment just described, the second end of each pre-shaped conducting element supported by the second face of each insulating support extends through the corresponding insulating support at least substantially in close vicinity of the third side of said support and terminates at the first face of this support. According to another possible modification, this second end remains on the second face of the corresponding insulating support.

In a modified version of all the modified embodiments of the second construction broadly set forth hereinabove, which is applicable in case the connecting units comprise a ground circuit adapted to co-operate with some of the second ends of the first pre-shaped conducting elements, one portion of the ground circuit extends along the third side of the insulating supports constituting each pair of said supports. Each portion on the ground circuit may therefore be disposed for example either between the second faces of the two insulating supports, respectively, constituting a pair of said supports, or substantially in alignment with one of the insulating supports, or alternatively in front of the gap existing between the two insulating supports, at least for one part outside the third side of said supports.

According to a modified construction application to all the modifications of the second form of embodiment of the invention, which comprises a ground circuit, at least one of the two insulating supports constituting one pair of such supports comprises at least one clearance extending transversely therethrough so as to open into its third side, in the vicinity of the corresponding portion of the ground circuit, to permit the passage of a plug-in conducting portion adapted to co-operate with the ground circuit, said conducting portion being provided on a function and/or protection module. According to another modified version, at least one of the two insulating supports constituting a pair of such supports comprises at least one clearance extending transversely through it and opening or not into its third side, in front of the two ends of the pre-shaped conducting elements, and/or in front of the corresponding ground circuit if one is provided, to permit the passage of said second ends, respectively, towards the corresponding second ends disposed on the other insulating support of the same pair of said supports, and/or towards the aforesaid ground circuit portion.

According to a modified version applicable to all the preceding forms of actuation of the second form of embodiment, one or a plurality of channels disposed side by side are provided in the gap left between the two stacked insulating supports constituting the pair of said supports, on or against one portion of the second face of at least one of said pair of insulating supports, said one portion being the one that is free of any pre-shaped conducting elements. One end of each channel opens on the side of the second face of said support which is opposite to that supporting the input or output terminals, the other end of the channel opening on a fourth side of said insulating support which is substantially opposite to the third side.

According to a third form of embodiment of the present invention, the insulating supports are note adapted to co-operate by pairs but held at spaced intervals from each other. The first and second pre-shaped conducting elements of a same line wire are disposed either both on the first face of the insulating support or one on the first face and the other on the second face of said insulating support. One insulating element is disposed between the first and second pre-shaped conducting elements supported by a same face of the insulating support. When this specific form of embodiment comprised a ground circuit, one portion thereof is disposed for example along the third side of the insulating supports and may be disposed notably substantially in alignment with the insulating support.

According to a modified version of these constructions, two groups of channels disposed substantially in a common plane parallel to said insulating supports are provided in the gap formed between two adjacent insulating supports. These two groups of channels open at a first end in close vicinity of the two opposite sides of the insulating supports, supporting the input terminals and the output terminals, and at their second ends on a fourth side of said insulating supports, which is substantially opposite to the third side.

The attached drawings illustrate diagrammatically by way of example typical forms of embodiment of the connecting unit according to this invention, which will now be described in detail with reference to the drawings.

BRIEF DESCRIPTION OF THE DRAWINGS

FIG. 20 is a section taken along the line XX—XX of FIG. 18, showing the same second form of embodiment of the invention.

FIG. 21 is a section taken along the line XXI—XXI of FIG. 18, showing the same second form of embodiment.

FIG. 22 is another section but taken along the line XXII—XXII of FIG. 18, showing the same second form of embodiment.

FIG. 23 is a fragmentary section taken along the line XXIII—XXIII of FIG. 18, showing the same second form of embodiment of the invention.

FIG. 24 is another fragmentary section taken along the line XXIV—XXIV of FIG. 18, of the second form of embodiment.

FIG. 25 is a fragmentary section taken along the line XXV—XXV of FIG. 18, showing the same second form of embodiment.

FIGS. 26 and 27 illustrate in fragmentary sections taken along the lines XXIII—XXIII and XXIV—XXIV, respectively, of a first modified version of the second form of embodiment.

FIGS. 28 and 29 illustrate in fragmentary section taken along the lines XXIII—XXIII and XXIV—XXIV, respectively, a second modified version of the same second form of embodiment of the invention.

DESCRIPTION OF THE PREFERRED EMBODIMENTS

Figure 1:
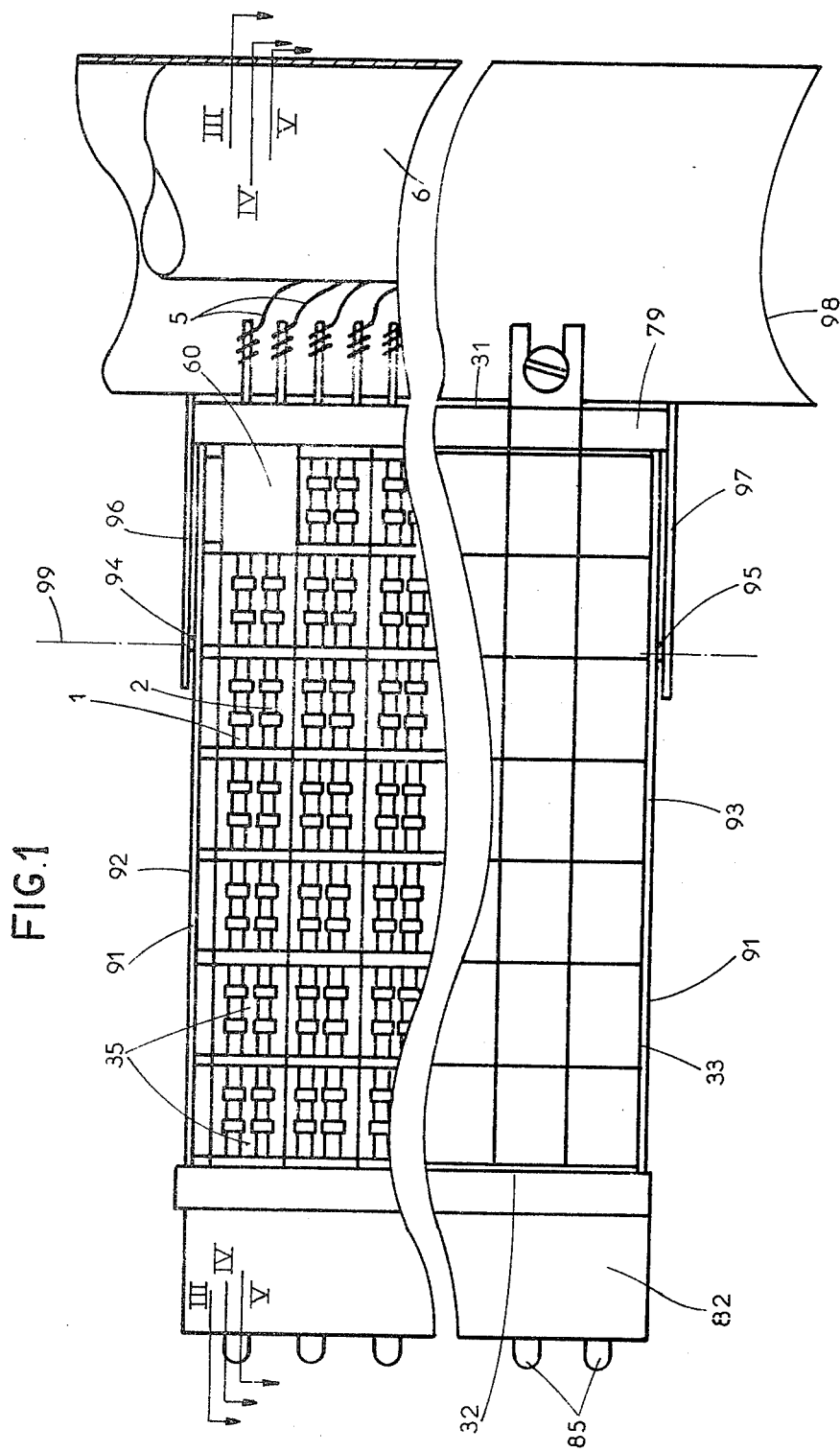
FIG. 1 is a side elevational view, with parts broken away, of a first form of embodiment of a connecting unit according to this invention.

As illustrated in FIGS. 1 to 6 of the drawings, the connecting unit according to this invention is intended for use as a connecting block for a cable end. It comprises means for connecting a predetermined number of line wires 5 from a same cable 6. This connecting unit consists notably of stacked pairs of insulating supports, each pair comprising an insulating support 1 and an insulating support 2 kept at a proper relative spacing, notably by the provision of ribs 4 (see FIGS. 5 and 6) formed integrally with the insulating support 2. Each insulating support 1 and each insulating support 2 comprise first faces, denoted 1' and 2', respectively (FIG. 6) opposite to each other, and second faces 1" and 2", opposite to the first faces and facing each other.

Each insulating support 1 comprises on its first face 1' pre-shaped conducting elements 11 disposed side by side, and other pre-shaped conducting elements 12 also disposed side by side. The pre-shaped conducting elements 11 comprise each a first end constituting an input terminal, denoted E1 to E7, respectively, and a second end, denoted Eb1 to Eb7, respectively; the pre-shaped conducting elements 12 comprise each a first end constituting an output terminal denoted S11 to S17, respectively, and a second end, denoted Sa1 to Sa7, respectively.

Figure 6:
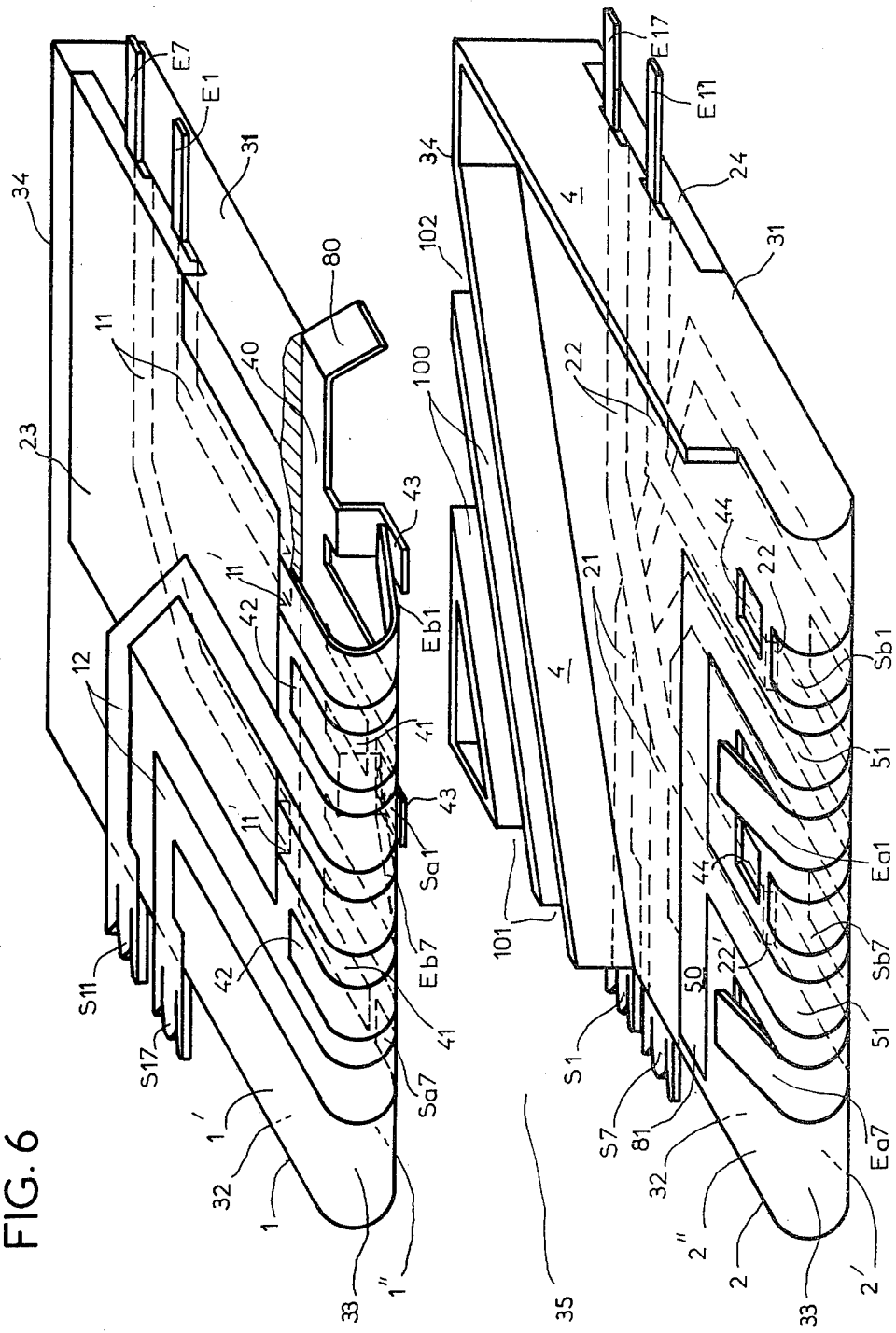
FIG. 6 is a perspective and exploded view showing two insulating supports constituting one pair of said supports shown in a simplified manner in the case ot the first form of embodiment.

On the other hand, each insulating support 2 comprises on its first face 2' pre-shaped conducting elements 21 disposed side by side, and pre-shaped conducting elements 22 also disposed side by side. The pre-shaped conducting elements 21 comprise each a first end constituting an output terminal denoted S1 to S7, respectively, and a second end, denoted Sb1 to Sb7, respectively. The pre-shaped conducting elements 22 comprise each a first end constituting an input terminal denoted E11 to E17, respectively, and a second end denoted Ea1 to Ea7, respectively. In this example, the pre-shaped conducting elements consist each of a metal strip cut and forming an insert in the insulating support, in which it is embedded or fitted. However, these pre-shaped conducting elements could as well consist of metal wires, for example round-sectioned metal wires. Only the pre-shaped conducting elements corresponding to input terminals E1, E7, E11 and E17 and to output terminals 51, 57, S11 and S17, are shown in FIG. 6.

All the input terminals E1 to E7, and E11 to E17, are disposed on an end face 31 of the corresponding insulating support, and all the output terminals S1 to S7 and S11 to S17 are disposed on a same end face 32 opposite to said face 31. The input terminals E11 to E17 of insulating support 2 are disposed in front of the input terminals E1 to E7 of the other insulating support 1. Similarly, the output terminals S1 to S7 of insulating support 2 register with the output terminals S11 to S17 of the insulating support 1.

The other ends of the pre-shaped conducting elements 11 and 12 are bent at an angle of about 180° towards the other face 1" of their insulating support 1; in this example, they are bent along the third side 33 secant to the first two sides 31 and 32 supporting the input terminals and the output terminals, respectively, of said insulating support 1; likewise, the other or second ends of the pre-shaped conducting elements 21 and 22 are bent at an angle of about 180° towards the second face 2" of their insulating support 2; they are also bent along the third side 33 of said insulating support 2. The second ends of the pre-shaped conducting elements 11, 12 and 21, 22 are thus set in the gap 35 left between the second faces 1" and 2" of insulating supports 1 and 2, respectively. The second end Eb1 registers with the second end Sb1; the second end Eb2 registers with the second end Sb2, and so forth. Likewise, the second end Ea1 registers with the second end Sa1; the second end Ea2 registers with the second end Sa2, and so forth. Thus, the means for connecting a line wire leading to the input terminal E1 comprise in succession of the corresponding pre-shaped element 11, the second end Eb1, the second end Sb1 registering therewith, the pre-shaped element 21 corresponding to said second end Sb1, and the output terminal S1. Since a line comprises two wires, the means for connecting the second wire, which is directed to the input terminal E11, comprise in succession: the corresponding pre-shaped element 22, the second end Ea1, the second end Sa1 registering therewith, the pre-shaped conducting element 12 corresponding to said second end Sa1, and the output terminal S11. The other line wires are connected in a similar manner. FIG. 6 illustrates by way of example the junction of the wires connected to the input terminals E1-E11 and E7-E17.

In this example, it will be seen that the first and second pre-shaped conducting elements, for instance 11 and 21, of a same line wire, for example the wire connected to the input terminal E1, are disposed the one on the first face 1' of one (1) of the pair of insulating supports, the other on the first face 2' of the other insulating support 2. Besides, it will be noted that some of the pre-shaped conducting elements, 11-12 on the one hand and 21-22 on the other hand, cross each other on their relevant insulating supports 1 and 2. These pre-shaped conducting elements are insulated by means of insulating elements consisting for example of thin plastics insulating plates or sheets; thus, an insulating plate or sheet 23 is disposed between the pre-shaped conducting elements 11 and 12, and another insulating plate or sheet 24 is disposed between the pre-shaped conducting elements 21 and 22. To permit the proper positioning of these insulating plates or sheets, the pre-shaped conducting elements 11 and 22 are embedded slightly more than the pre-shaped conducting elements 12 and 21 in their insulating supports. For these reasons, the elements 11 and 22 are bent at 11' and 22'.

Furthermore, each pair of insulating supports 1, 2 comprises one fraction of a ground circuit, consisting of a conducting plate 40 engaging for example the second face 1" of the insulating support 1, parallel to the third side 33 and more remote from this third side 33 than the second bent ends of the pre-shaped conducting elements 11 and 12. Each plate 40 comprises extensions 41 engaging the second face 1" and extending towards the second bent ends Sa1 to Sa7 respectively but without contacting said second bent ends (see FIG. 6). Each plate 40 comprises other extensions 42 bent to an angle of about 180° along the third side 33 against the first face 1' of the insulating support 1 (see FIGS. 4 and 6). Each plate 40 comprises extensions 43 (FIG. 6) bent towards the second face 2" of insulating support 2 and substantially parallel thereto; these extensions 43 register with the second bent ends Eb1-Eb7 respectively, which they support, said second ends Eb1 to Eb7 being in fact bent to an angle of somewhat less than 180°, for example about 160°. These second ends Eb1 to Eb7 are thus each in contact with an extension 43, not with the second bent ends Sb1 to Sb7 registering likewise with said bent ends on the second face 2" of the insulating support 2. Clearance holes 44 (FIG. 6) are formed through said second face 2" to facilitate the easy positioning of the end portions of said extensions 43. The assembly is completed (see FIGS. 4 and 6) in succession, along the third side 33 of the insulating support 1, from the end side 31, the second bent end Eb1 contacting an extension 43, a bent extension 42, the second bent end Sa1 and an extension 41, the second bent end Eb2 contacting an extension 43, another bent extension 42, the second bent end Sa2 and an extension 41, and so forth.

On the other hand, each pair of insulating supports 1, 2 comprises a signal conducting circuit consisting of a conducting plate 50 (FIGS. 5 and 6) disposed in this example against the second face 2" of the insulating support 2, parallel to the third side 33 and more remote from said side 33 than the second bent ends of the pre-shaped conducting elements 21 and 22. Each plate 50 comprises extensions 51, substantially parallel to each other, bent to an angle of 180° against the first face 2' of support 2, along the third side 33. These bent extensions 51 register with the bent extensions 42 of plate 40 of the ground circuit, respectively, but they are not in contact with one another. The assembly further comprises, in succession (FIGS. 5 and 6), along the third side 33 of the insulating support 2, from the end side 31, the second bent end Sb1, a bent extension 51 of plate 50, the second bent end Ea1, the second bent end Sb2, a bent extension 51, the second bent end Ea2, and so forth.

Figure 2:
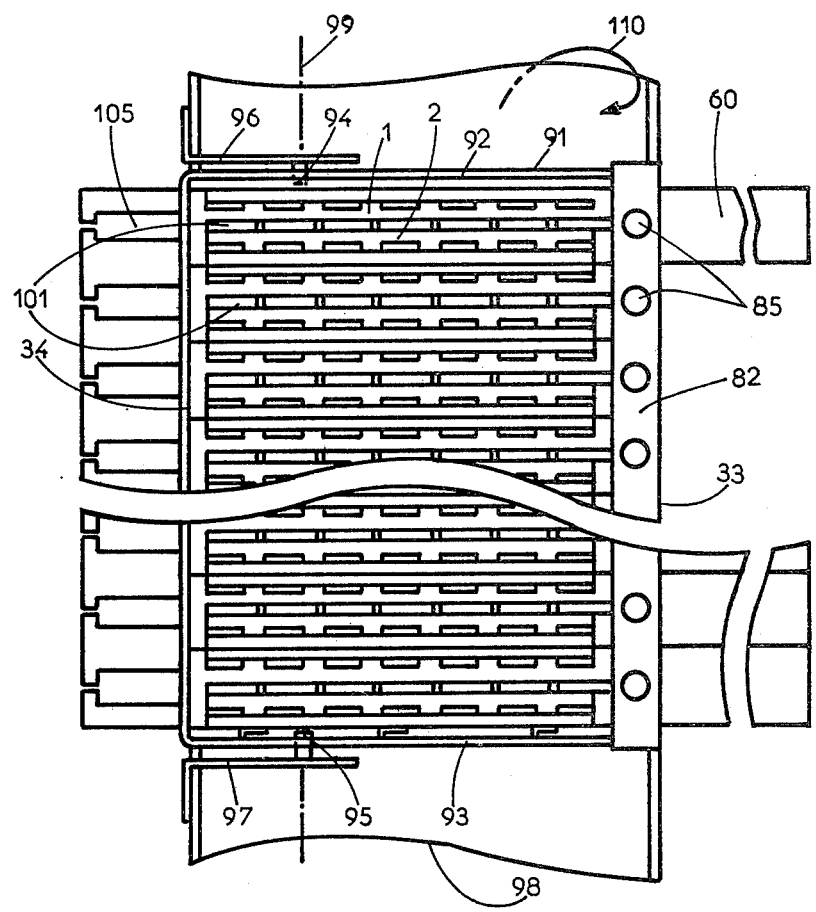
FIG. 2 is a side elevational view taken from the left-hand side of FIG. 1, showing the same first form of embodiment.
Figure 3:
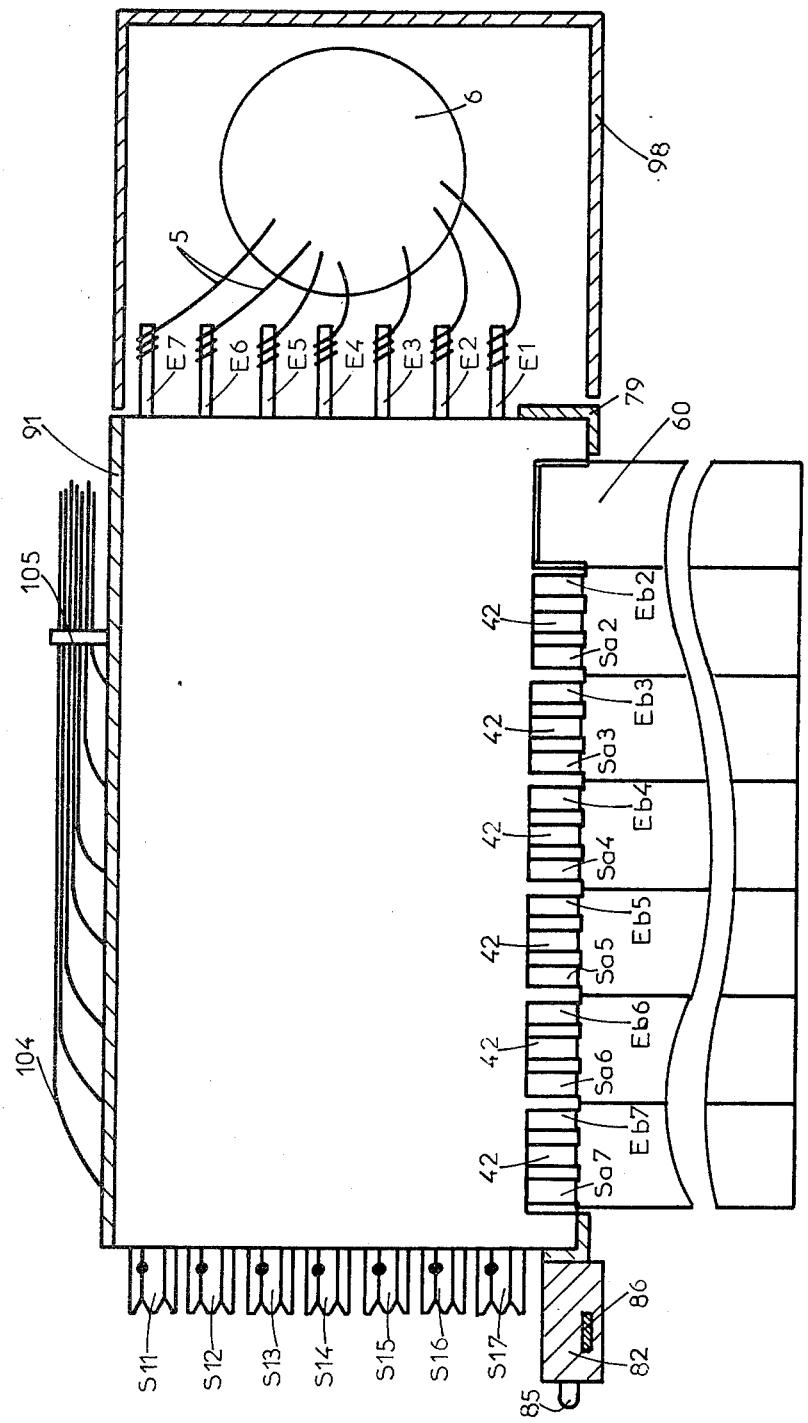
FIG. 3 is a section taken along the line III—III of FIG. 1, showing the same first form of embodiment.
Figure 4:
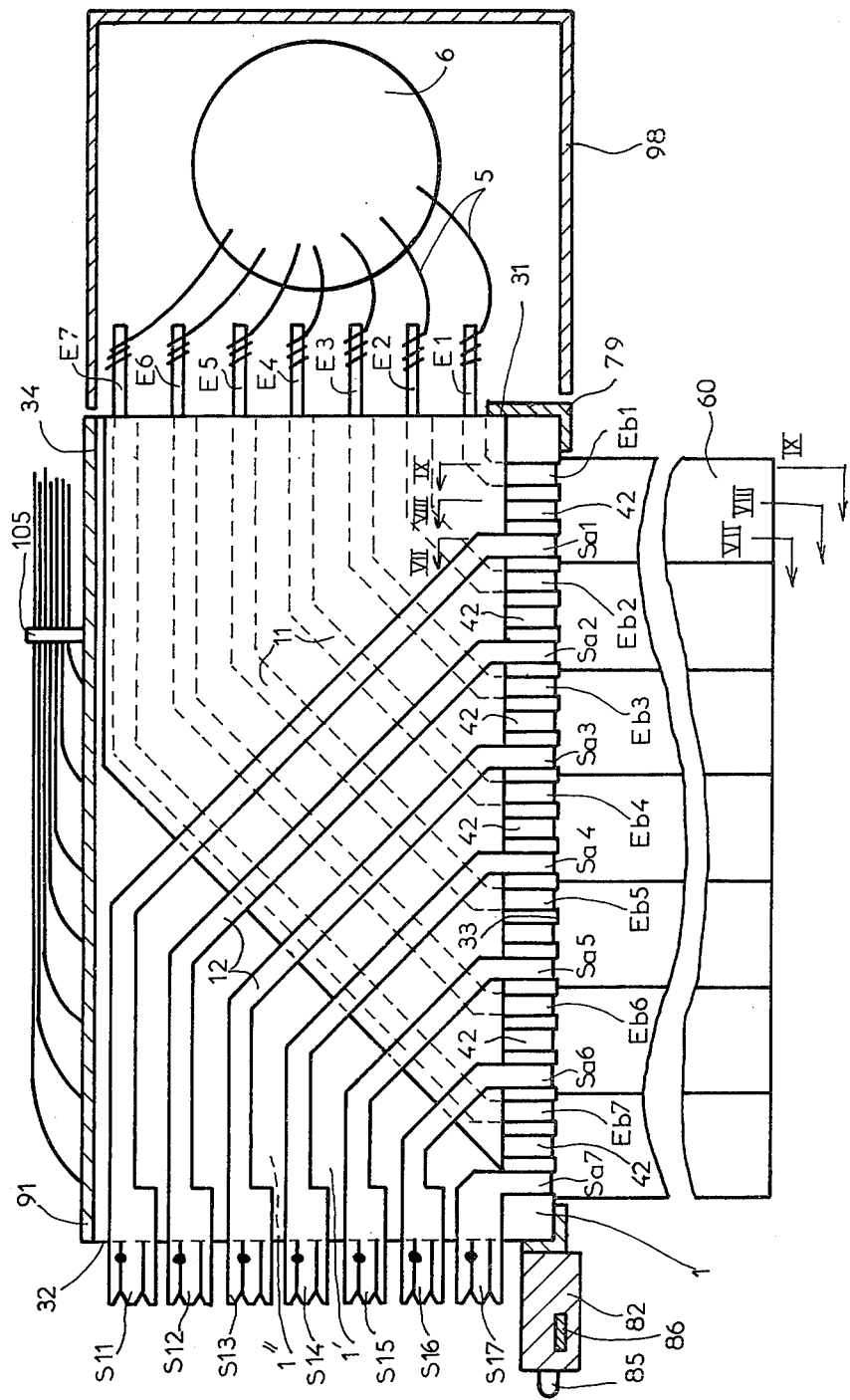
FIG. 4 is another section taken along the line IV—IV of FIG. 1.
Figure 5:
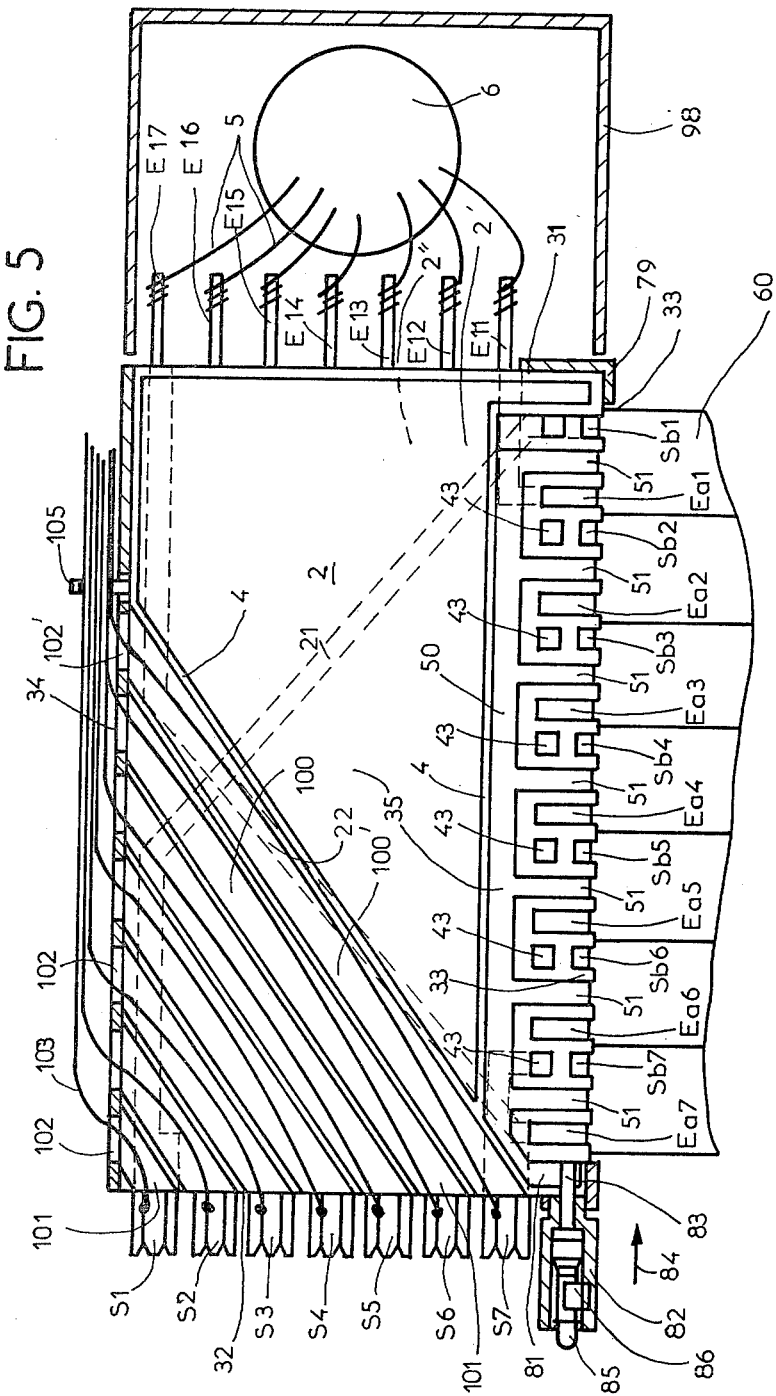
FIG. 5 is a section taken along the line V—V of FIG. 1.

As illustrated in FIGS. 1 and 2, the stacked assembly of insulating supports 1, 2 is held in position by a U-shaped member 91. The two wings 92 and 93 of this member 91 have a pair of aligned orifices formed therethrough, which are engaged with a slight clearance by the pivot pins 94 and 95 rigid with brackets 96 and 97, respectively, these brackets being rigid with a trough 98 enclosing the cable 6. The pivot pins 94 and 95 provide for the complete connecting unit a pivot axis 99 which, in this example, is substantially vertical. As illustrated in FIGS. 2, 5 and 6, a plurality of channels disposed side by side between the ribs 4 projecting from each insulating support 2 are formed in the gap separating the insulating supports 1 and 2 constituting each pair of such supports. Each channel 100 terminates at one end 101 close to the output terminals, such as S1–S11, corresponding to the two wires of a same line, and at the other end 102 close to a fourth side 34 substantially opposite to the third side 33 of the stacked insulating supports. Each channel 100 is adapted to receive the two wires of a same line which are connected to the corresponding output terminals, such as S1–S11 in this example. At their point of emergence from the second end 102 of channels 100 the wires are held in position by a wire clamp or grommet 105. The pivot axis 99 of the connecting unit is located near the fourth side 34 of the insulating supports, between the end side 31 on which the input terminals are disposed, and the second end 102' of the channel 100' nearest to said side 31.

Figure 7:
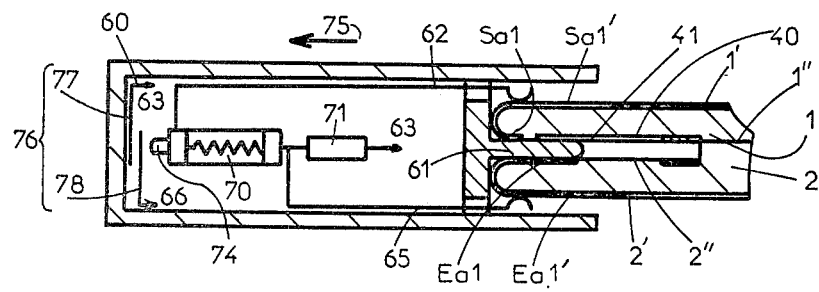
FIG. 7 is a diagrammatical section taken along the line VII—VII of FIG. 4, of the first form of embodiment.
Figure 8:
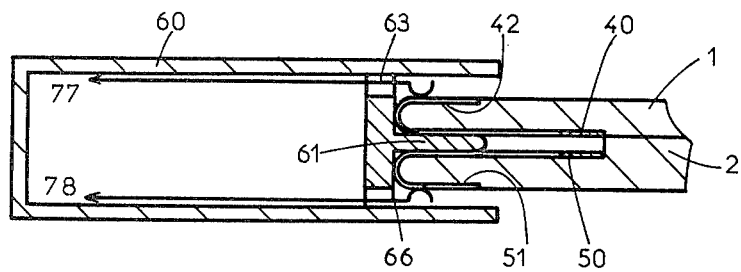
FIG. 8 is a fragmentary section taken along the line VIII—VIII of FIG. 4, of the first form of embodiment.
Figure 9:
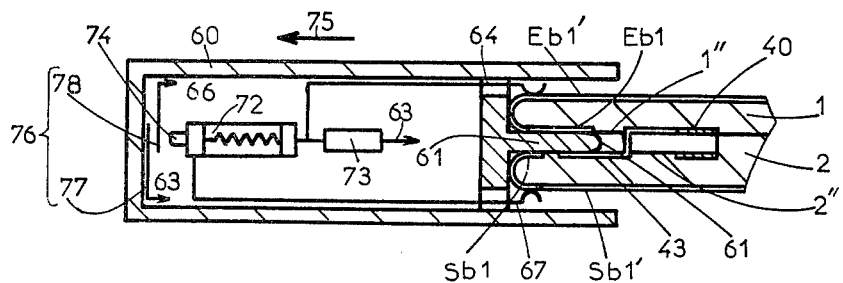
FIG. 9 is a fragmentary section taken along the line IX—IX of FIG. 4, of the said first form of embodiment.

The connecting unit of which the general disposition has been described hereinabove is adapted to receive plug-in modular units. FIGS. 7 to 9 illustrate by way of example a typical embodiment of a module 60 comprising an insulating plug-in terminal 61 extending throughout the width of this module 60, said terminal 61 being adapted to be engaged between the second faces 1" and 2" respectively of two insulating supports 1 and 2, respectively, for insulating on the one hand (FIG. 7) the second bent end Ea1 of the corresponding extension 41 of ground circuit 40, and on the other hand (FIG. 9) the second end Eb1 of the extension 43 of the same ground circuit 40. This module 60 also comprises conducting terminals 62, 63, 64 and 65, 66, 67 parallel to, and on either side of, the insulating terminal 61 so as to register with the first two faces 1' and 2' of insulating supports 1 and 2, respectively; thus, (FIG. 7), terminals 62 and 65 engage the portions Sa1' and Ea1' close to the corresponding bent portions Sa1 and Ea1. Similarly, the terminals 64 and 67 (FIG. 9) contact the portions Eb1' and Sb1' respectively, close to the corresponding bent portions Eb1 and Sb1. Besides, (FIG. 8) the terminals 63 and 66 disposed between terminals 62, 64 and 65, 67 contact a bent extension 51 of plate 50 of the signal circuit, respectively. Inside the module 60, a fuse 70 is connected across terminals 62 and 65; another fuse 72 is connected across terminals 64 and 67; a lightning arrester 71 is connected between terminals 65 and the terminal 63 connected to the ground circuit; another lightning arrester 73 is connected across terminals 64 and 63. On the other hand, the module 60 also contains a device for detecting the faulty condition of said fuses 70 and 72; to this end, the fuses 70, 72 comprise each a push member 74 adapted to move in the direction of the arrow 75 when the fuse has blown out. Registering with each push member 74 is a front contact 76 consisting of a fixed blade 77 connected to terminal 63 and of a movable blade 78 connected to terminal 66.

Besides, as illustrated notably in FIG. 5, each plate 50 of the signal circuit comprises an end portion 81. A module 82 extending for example throughout the height of the stacked pairs of insulating supports 1, 2 comprises conducting terminals 83 parallel to each other and of the plug-in type as shown at 84 (FIG. 5), so that each terminal 83 contacts an end portion 81. This module 82 carries a row of electric bulbs 85 each connected between the terminal 83 and the positive terminal of a common source of direct current via a conducting element 86 extending along the entire height of the stacked pairs of insulating supports 1, 2. The negative terminal of the same source of direct current is connected to the plate 40 of each pair of insulating supports 1, 2 via a conducting element 79 extending throughout the height of the stack formed by said pairs of insulating supports and contacting a bent lug 80 incorporated in each plate 40 (FIG. 6).

With this arrangement, when the signal module 82 and the protection module 60 are plugged in (FIG. 5 and FIGS. 7 to 9), the input terminal E1 is no more connected via the second bent end Eb1 to the extension 43 of ground circuit 40 (FIG. 9), but it is connected to the output terminal S1 via the portion Eb1' of terminal 64, fuse 72, terminal 67 and portion Sb1'. Likewise, the input terminal E11 is no more connected via the bent end Ea1 to the extension 41 of ground circuit 40 (FIG. 7), but it is connected to the output terminal S11 via portion Ea1', terminal 65, fuse 70, terminal 62 and portion Sa1'.

In case of failure of this last fuse 70, the push member 74 associated therewith will move the corresponding movable blade 78 in the direction of the arrow 75 in order to cause said blade 78 to engage the fixed blade 77. Thus, the circuit between the relevant bulb 85 and the negative terminal of the source of direct current is closed via terminal 83, signal plate 50, contact 76, ground plate 40, so that the bulb 85 is energized to show the operator the location of the faulty fuse.

To replace a blown fuse, the corresponding module 60 is replaced by a new one. For this purpose, if the connecting unit is too close to the adjacent connecting unit, it is a simple matter to pivot it about its axis 99 so that the modules 60 will tend to face the operator and can thus be removed without difficulty, inasmuch as they are plugged in through only a relatively short distance, the pre-shaped conducting elements being bent in close vicinity of the side 33 of the stacked insulating supports. For the same reasons, the second bent ends of the pre-shaped conducting elements can easily be cleaned manually.

When the module 60 is removed, the electrical continuity is broken between each input terminal E1–E11 and the corresponding output terminal, S1–S11 respectively, the two input terminals E1–E11 being connected to the ground circuit plate 40.

Figure 10:
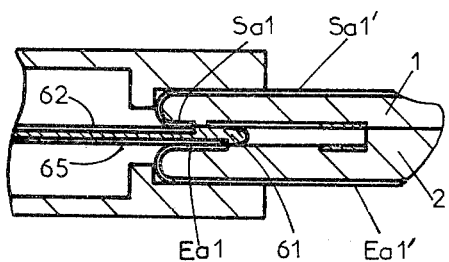
FIGS. 10 and 11 illustrate in fragmentary section taken along lines VIII—VIII and IX—IX a modified version of the first form of embodiment.
Figure 11:
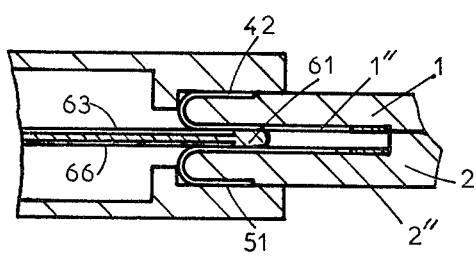

Of course, it would not constitute a departure from the basic principles of the present invention to use a slightly different module 60. Thus, as shown in FIG. 10, the plug-in terminals 62 and 65 pf FIG. 7, instead of co-operating with the portions Sa1' and Ea1', respectively, could be arranged on either side of the insulating terminal 61 and cooperate with the second bent ends Sa1 and Ea1, respectively. Similarly, the plug-in terminals 64 and 67 of FIG. 9 could co-operate with the second bent ends Eb1 and Sb1, respectively. On the other hand, as illustrated in FIG. 11, the terminals 63 and 66 of FIG. 8, instead of contacting the bent extensions 42 and 51, could be disposed on either side of the insulating terminal 61 and co-operate with portions of the bent extensions 42 and 51, respectively, which are close to the aforesaid bent portions but located on the second faces 1" and 2" of insulating supports 1 and 2, respectively.

In case no protection device were contemplated for each line wire, the modules utilized in the unit are only function modules. In a first case, this module consists only of an insulating plate substituted for the insulating terminal 61 of FIGS. 7 to 11. In a second case, the insulating terminal is maintained, and the module contains means for establishing a permanent connection between on the one hand the terminals 65 and 64 to be connected each to a separate input terminal, and on the other hand the terminals 62 and 67 adapted to be connected each to a separate output terminal. Thus, when the module is plugged in, the two inputs and the two outputs of the two wires of a same line are looped, respectively. In a fourth case, the insulating terminal 61 is dispensed with, and the module incorporates means for establishing a permanent connection between the terminals 62 and 67 to be each connected to a separate output terminal. Thus, when the module is plugged in, the two outputs of the two wires of a same line are looped, and the two corresponding inputs remains grounded.

Figure 12:
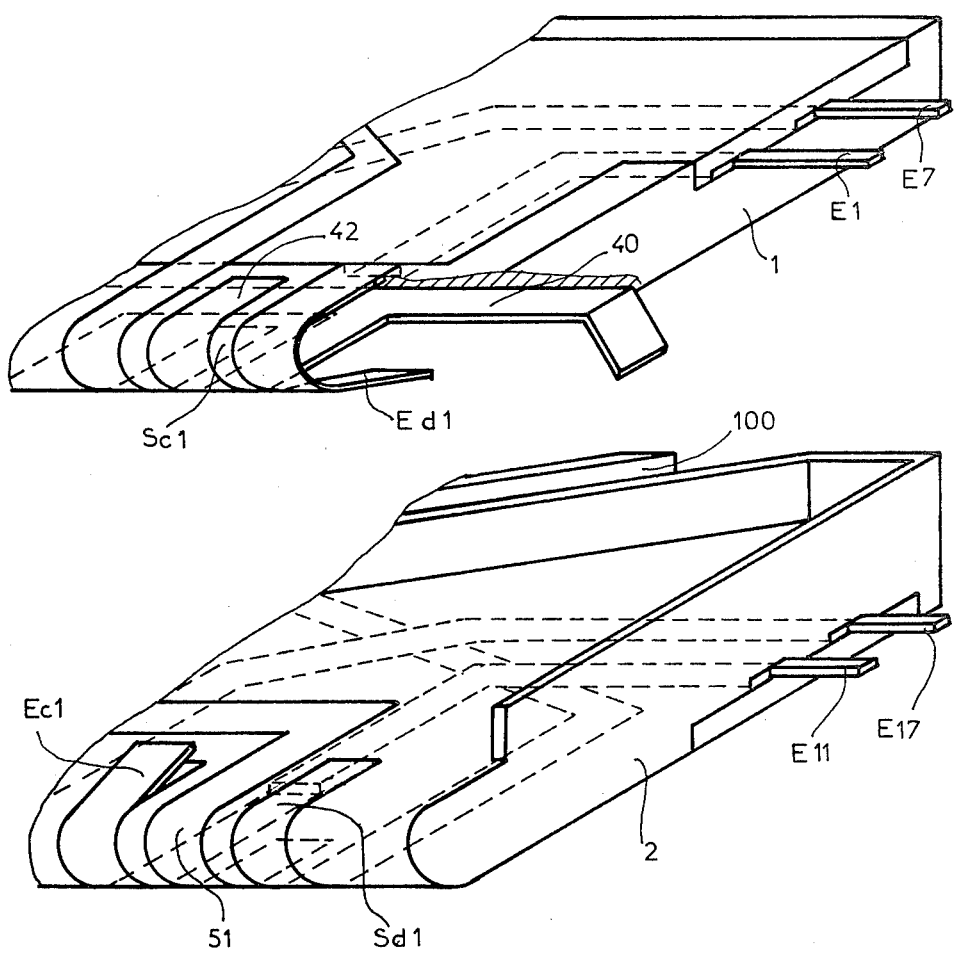
FIG. 12 is a fragmentary perspective and exploded view of a second modified version of a pair of insulating supports.

In a modified version illustrated in FIG. 12 the extensions 41 and 43 of plate 40 of the ground circuit are dispensed with. On the other hand, the second bent ends Eb1 and Sb1 of FIG. 6 are replaced by the bent ends Eb1 and Sd1, respectively, having substantially the same length, one of these bent ends, for example Ed1, being reinforced so as to bear against the other one in the inoperative condition, i.e. when no module is present. Similarly, the second bent ends Ea1 and Sa1 of FIG. 6 are replaced by the bent ends Ec1 and Sc1, respectively, having substantially the same length, and of which one end, for example Ec1, is reinforced, so as to bear against the other bent end in the inoperative position, i.e. when no module is present. All the other elements are identical with those described in connection with the preceding form of embodiment (FIGS. 1 to 11).

When no module is plugged in, the electrical continuity is provided without any protection device, between the input and output of each line wire. When the protection module illustrated in FIGS. 7 to 9 or 10 and 11 is plugged in, the electrical continuity is still preserved but through the protection means contained in the module. These protection means, and the signal device, operate in this case as explained in the foregoing.

It is also possible to utilize function modules without any protection means. Thus, as in the first case mentioned hereinabove, a module, consisting simply of an insulating plate substituted for the insulating terminal 61 of FIGS. 7 to 11, is adapted to break the electrical continuity between each input terminal and each corresponding output terminal, by separating on the one hand the second bent ends Ed1 and Sd1, on the other hand the second bent ends EC1 and SC1. As in the third case mentioned hereinabove, a module may comprise an insulating terminal 61 for breaking the electrical continuity between the corresponding inputs and outputs, and permanent connecting means between the terminals, on the one hand 65 and 64 co-operating with Ec1 and Ed1, respectively, and on the other hand 62 and 67 co-operating with Sc1 and Sd1, respectively; the two inputs and the two outputs of the two wires of a same line are thus looped. In another case, the module is identical with that of the third case mentioned hereinabove; it further comprises a permanent connection between terminals 65 and 64 on the one hand, and the ground circuit on the other hand, for example via a bent extension 42 thereof and a terminal such as 63, FIG. 8. The two inputs of the two wires of a same line are not only looped but also grounded. In another case, the module still comprises an insulating terminal 61 but contains only the means for establishing a permanent connection between terminals 65 and 64 (co-operating with Ec1 and Ed1, respectively), and the ground circuit, on the other hand, via a bent extension 42, as in the preceding case; the two separate inputs of the two wires of a same line are thus looped and grounded when the module is plugged in.

Figure 13:
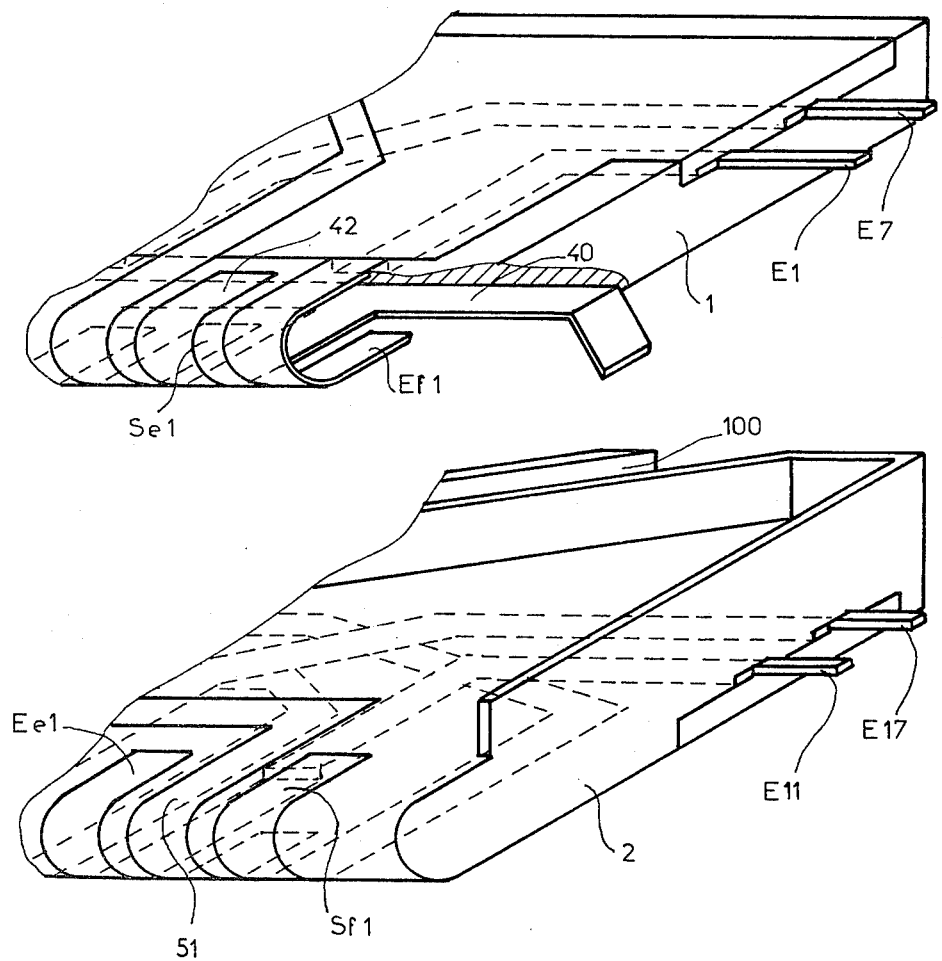
FIG. 13 is a fragmentary perspective and exploded view of a second version of the pair of insulating supports.

In another form of embodiment illustrated in FIG. 13 the extensions 41 and 43 of plate 40 are dispensed with as in the preceding form of embodiment. On the other hand, the second bent ends Eb1 and Sb1 of FIG. 6 are replaced by the bent ends Ef1 and Sf1, respectively, having substantially the same length; likewise, the second bent ends Ea1 and Sa1 of FIG. 6 are replaced by the bent ends Ee1 and Se1, respectively, having substantially the same length. All these bent ends are bent at 180° in relation to the pre-shaped conducting element of which they are an integral part. In the inoperative position, when no module is plugged in, they do not contact one another. All the other elements are identical with those of the first form of embodiment already described in detail hereinabove.

When no module is plugged in, the electrical continuity of the two wires of a same line is thus broken. When the protection module illustrated in FIGS. 7 to 9 or 10 and 11 is plugged in, the electrical continuity is provided by protection means enclosed in the module. These protection means and the signal device operate as already explained in the foregoing.

It is also possible to utilize function modules without any protection means. Thus, permanent connections or junctions may be provided within the modules so that several alternatives can be obtained at will, such as: looping the second bent ends Ee1, Ef1 on the unit input side, with grounding at 40 of Ee1 and Ef1; electrical continuity between each second bent end Ee1, Ef1 and each second bent end Se1 and Sf1, respectively, with the assistance of conducting terminals interconnecting for example two bent ends in face to face relationship; looping the second bent ends Ee1 and Ef1, on the unit input side, and looping the second bent ends Se1 and Sf1, on the unit output side, the terminals Ee1 and Ef1 being grounded or not.

Figure 14:
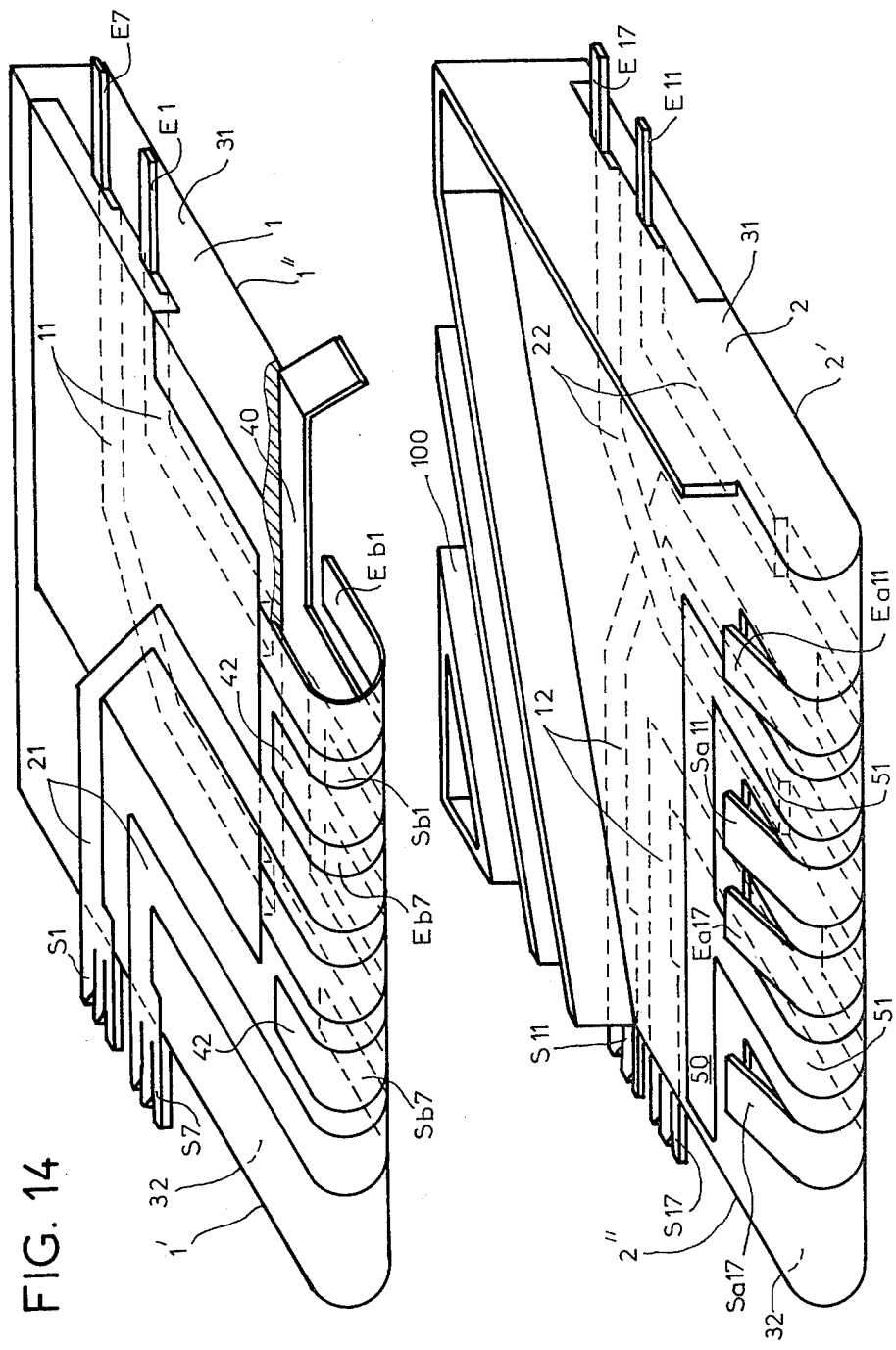
FIG. 14 is a perspective and explosed view of a third version of a pair of insulating supports.

In another modified form of embodiment illustrated in FIG. 14, the pre-shaped conducting elements 11, 12, 21 and 22 are disposed on their insulating supports 1 and 2 but in a manner differing from the one described in the preceding cases. The insulating support 1 supports the pre-shaped conducting elements, not only 11 but also 21, on its face 1'; thus, the input terminals E1 and E7 are carried by the same insulating support as the corresponding output terminals S1 and S7. Similarly, the insulating support 2 carries on its face 2' the preshaped conducting elements, not only 22 but also 12; again, the input terminals E11 and E17 are on the same insulating supports as the corresponding output terminals S11 and S17. The input terminals E1 and E7 are disposed in front of the input terminals E11 and E17, respectively; similarly, the output terminals S1 and S7 are disposed in front of the output terminals S11 and S17, respectively. The second bent ends Eb1, Sb1, Eb7, Sb 7 bent against the second face 1" are disposed substantially in front of the second bent ends Ea 11, Sa 11, Ea 17 and Sa 17 bent against the second face 2". The last-mentioned second bent ends are preset and, in the inoperative condition, contact each the second bent end registering therewith. On the insulating support 1 a bent extension 42 of ground circuit 40 is disposed between the second bent ends Eb 1 and Sb 1, Eb 7 and Sb 7. On the other insulating support 2, a bent extension 51 of signal circuit 50 is disposed between the second bent ends Ea 11 and Sa 11, Ea 17 and Sa 17. The ground circuit does not comprise any extensions 41 and 43. All the other component elements are unchanged, notably in comparison with those of the first form of embodiment (FIGS. 1 to 11).

In the inoperative conditions, when no module is plugged in, the two input terminals, such as E1 and E 11, of the two wires of a same line, are looped by means of Eb 1 which is in direct contact with Ea 11. Similarly, the corresponding output terminals S 1 and S 11 of the two wires of a same line are looped by means of Sb 1 which contacts Sa 11.

It is also contemplated to utilize this unit possibly in combination with protection modules comprising each protection means for example for two line wires. As illustrated diagrammatically in FIGS. 15 and 16, and also in FIG. 8 which remains pertinent to this case, a fuse 70 is connected across two terminals 64 and 67 connected in turn to Eb 1 and Sb 1. Likewise, a second fuse 72 is connected across two terminals 65 and 62 connected in turn to Ea 11 and Sa 11. A lightning arrester 71 is connected between a first terminal Eb 1 and a terminal 63 grounded at 42; a second ligthning arrester 73 is connected across terminal 65 (connected to Ea 11) and the grounded terminal 63. The signal device is the same as that described hereinabove notably with reference to FIGS. 7 to 9. All the other component elements are unchanged with respect to those described with reference to the first form of embodiment, and the assembly operates like this first form of embodiment.

Figure 17:
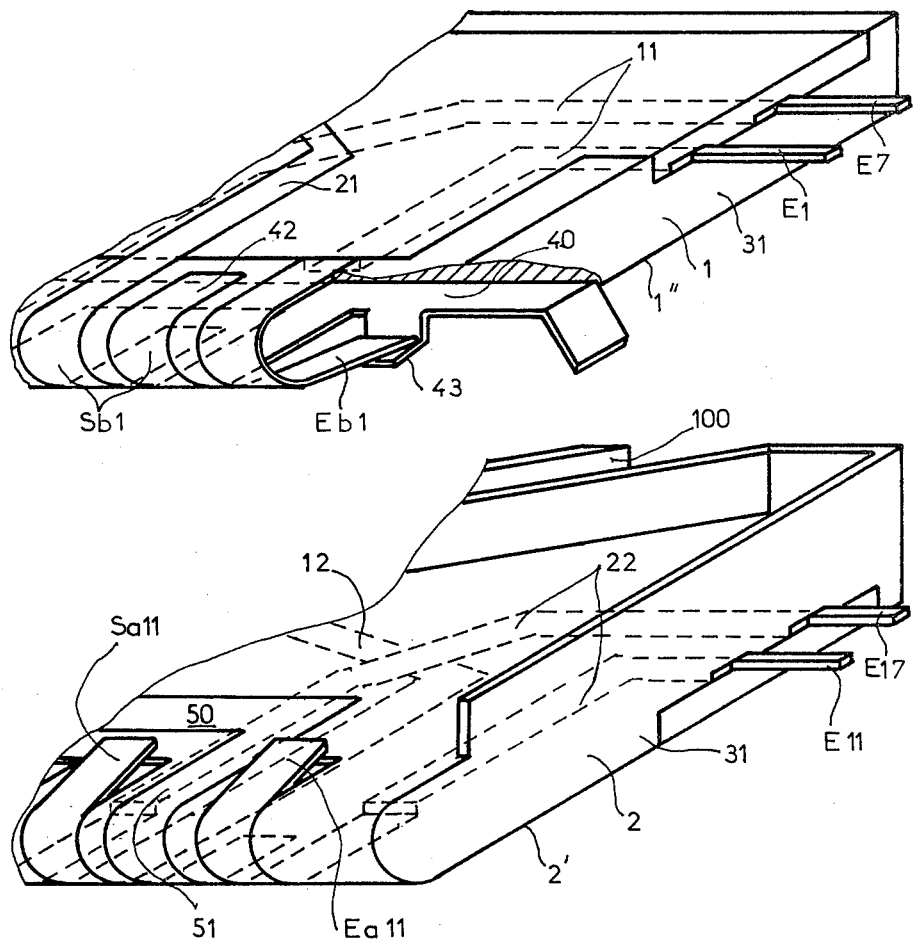
FIG. 17 is a fragmentary perspective and exploded view of a fourth version of a pair of insulating supports.
Figure 18:
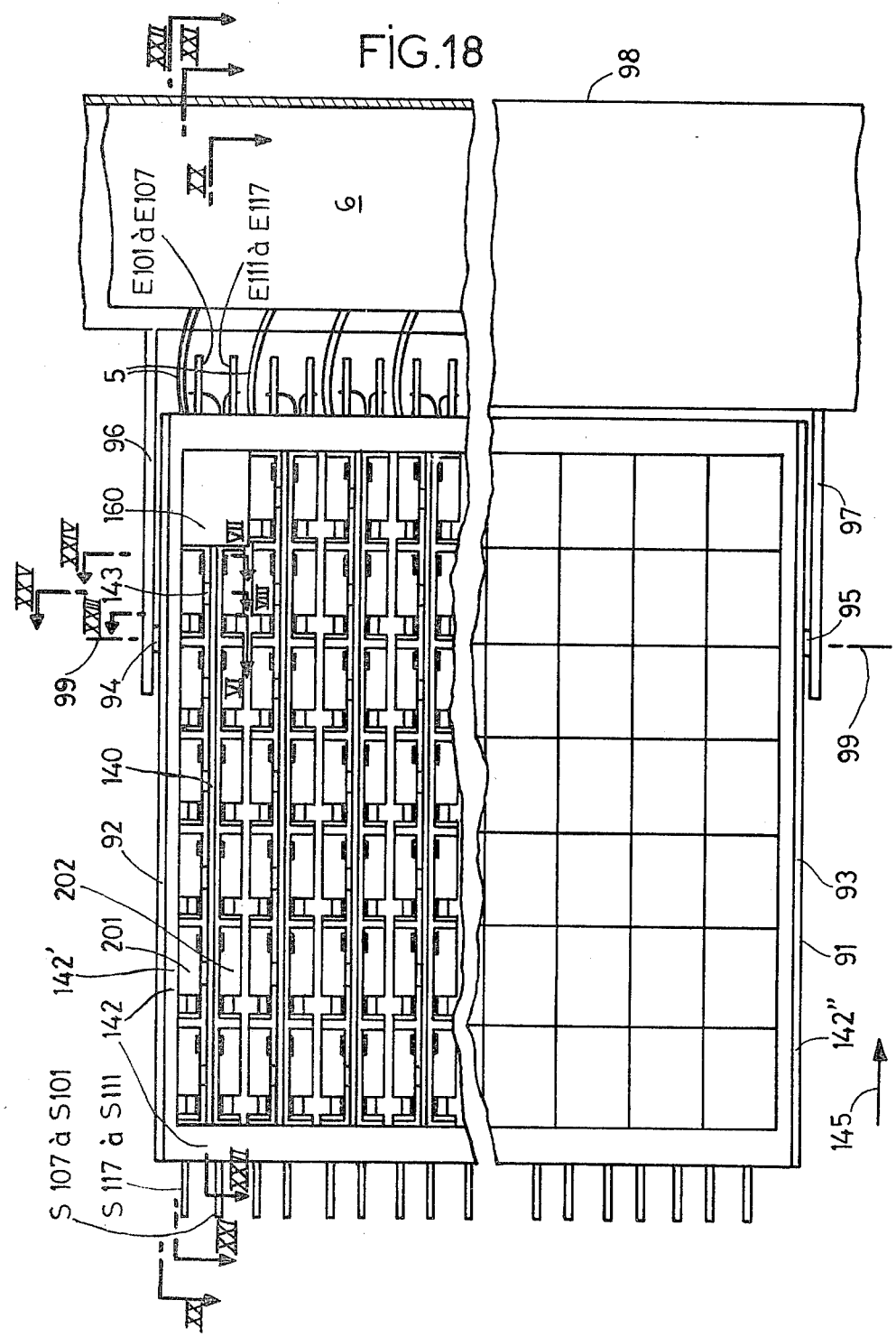
FIG. 18 illustrates in side elevational view a second form of embodiment of the invention.
Figure 19:
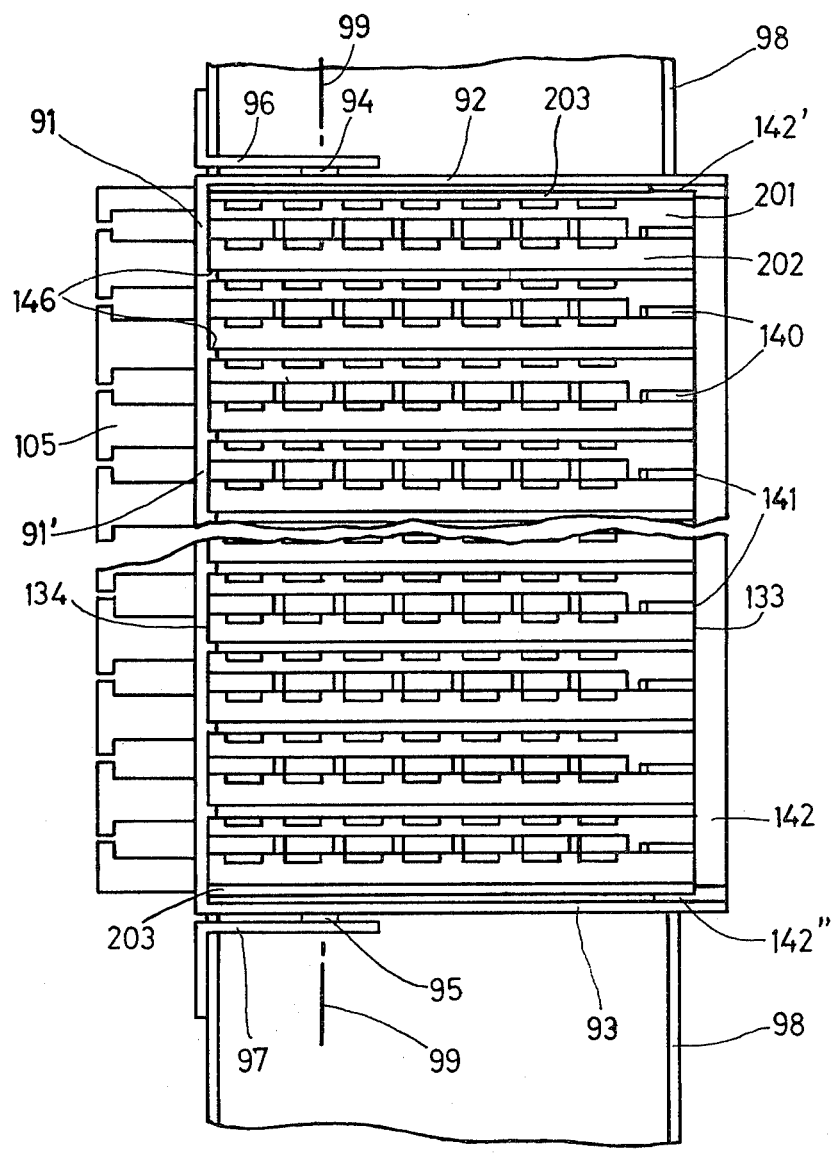
FIG. 19 is a view taken from the left side of FIG. 18, showing the same second form of embodiment of the invention, shown without its modules.

In the modified version illustrated in FIG. 17, the pre-shaped conducting elements are disposed in the same fashion as in FIG. 14. The only difference in relation to the structure shown in FIG. 14 is that the extension 43 of ground circuit 40 is provided (as in FIG. 6), the second bent end Eb 1 being reinforced and in contact with the extension 43. The second bent end Ea 11 registering with the former is also in contact with the extension 43. In the inoperative condition, i.e. when no module is present, the second bent ends Eb 1 and Ea 11 connected to input terminals are thus looped and grounded.

Figure 15:
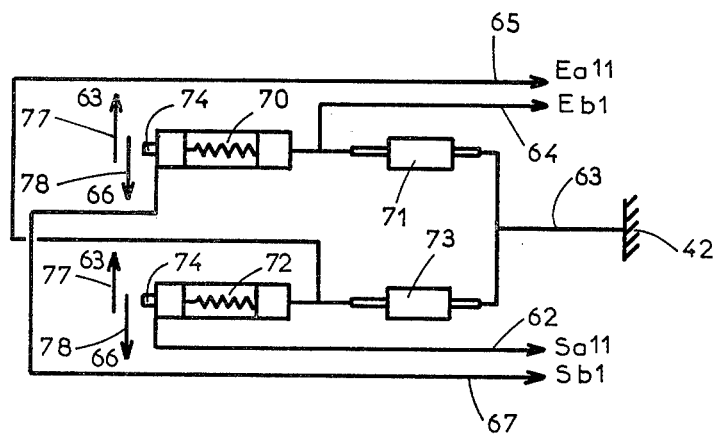
FIG. 15 is the wiring diagram concerning a module utilized in the third version of the first form of embodiment.
Figure 16:
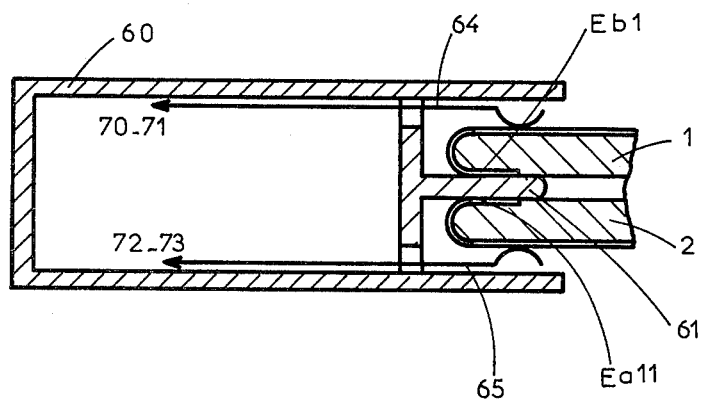
FIG. 16 is a fragmentary section taken like the section of FIG. 7 showing the module utilized in the third version of this first form of embodiment.

The protection module illustrated in FIGS. 15, 16 and 8, utilized with the preceding modified structure, is also applicable in this case. The insulating terminal 61 separates electrically from the ground and from one another on the one hand the terminals 64 and 65 and on the other hand the terminals 62 and 67, when the module is plugged in. The assembly operates like the one of the preceding version (FIGS. 14 to 16).

The two forms of embodiment shown in FIGS. 14 and 17 may also be utilized with function modules similar to those described hereinabove. With these function modules, anyone of the wiring diagrams or junctions mentioned in the description of the preceding versions of this form of embodiment can be obtained.

As illustrated in FIGS. 18 to 25, the second form of embodiment of the invention is still utilized as a connecting unit for a cable head. It comprises means for connecting a number of line wires 5 issuing from a cable 6. The connecting unit comprises notably stacked pairs of insulating supports, each pair comprising an insulating support 201 and an insulating support 202 kept at a certain relative spacing from each other. Each insulating support 201 and each insulating support 202 comprise first faces, denoted 201' and 202', respectively, opposed to each other, and second faces 201" and 202" also registering with each other (see FIGS. 21 to 25). An insulating plate 203 is disposed on top and beneath the stacking.

Each insulating support 201 comprises (see FIG. 21) on its first face 201' pre-shaped conducting elements 112 disposed side by side, and on its second face 201" pre-shaped conducting elements 111 disposed side by side. The pre-shaped conducting elements 111 comprise each a first end constituting an input terminal denoted E 101 to E 107, respectively, and a second end, denoted Eb 101 to Eb 107, respectively. The pre-shaped conducting elements 112 comprise each a first end, denoted S 111 to S 117, respectively, and a second end denoted Sa 101 to Sa 117, respectively.

Each insulating support 202 comprises (FIG. 22) on its first face 202' pre-shaped conducting elements 122 disposed side by side, and on its second face 202" pre-shaped conducting elements 121 also disposed side by side. Each pre-shaped conducting element 121 comprises a first end constituting an output terminal denoted S 101 to S 107, respectively, and a second end, denoted Sb 101 to Sb 107, respectively. Each pre-shaped element 122 comprises a first end constituting an input terminal E 111 to E 117, respectively, and a second end, Ea 101 to Ea 107, respectively. In this example, the pre-shaped conducting elements consist each of a metal strip cut and forming an insert on the corresponding insulating support. Alternatively, each pre-shaped conducting element may consist of metal wire sections, for example of cylindrical crosssection. Only the pre-shaped conducting elements corresponding to input terminals E and to output terminals S denoted 111 and 107, 101 and 107 are shown in FIG. 22 in order to simplify the drawing and facilitate the understanding thereof.

All the input terminals E 101 to E 107, and E111 to E 117, are disposed on a same end side 131 of the corresponding insulating supports, and all the output terminals S 101 to S 107, and S 111 to S 117, are disposed on an end side 132 opposed to side 131. The input terminals E 111 to E 117 of insulating support 202 are disposed in front, respectively, of input terminals E 101 to E 107 of the other insulating support 201. Likewise, the output terminals S 101 to S 107 of insulating support 202 are disposed on the front, respectively, of the output terminals S 111 to S 117 of the other insulating support 201.

It will be seen that in this form of embodiment the first and second pre-shaped conducting elements 111 and 121, for instance, of a same line wire, connected to the input terminal E 101, for example, are disposed the one on one of the faces, for example 201', of the insulating support 201, and the other on one of the faces, for example 202", of the other insulating support 202. On the other hand, the second end, Eb 101 to Eb 107 and Sb 101 to Sb 107, respectively, of each pre-shaped conducting element supported by the second face 201" and 202", respectively, of each insulating support 201 and 202, respectively, extends through the corresponding insulating support via an orifice 200 (FIG. 24) located in close proximity of a third side 133 of each insulating support. Each second end of pre-shaped conducting element will thus pass through its inherent aperture 200 and is then directed at right angles to the third side 133 along which it is discontinued. These second ends are thus disposed side by side with the second ends, Sa 101 to Sa 107 and Ea 101 to Ea 107, respectively, of the pre-shaped conducting elements disposed on the first faces, 201' and 202', respectively, of the same insulating supports. These second ends Sa 101 to Sa 107 and Ea 101 to Ea 107 are also directed at right angles to the third side 133 along which they are discontinued. The third side 133 is secant to the first two sides supporting the input terminals and the output terminals, respectively.

In this example, the second end Eb 101 registers with the second end Sb 101 (FIG. 24); the second end Eb 102 registers with the second end Sb 102, and so forth. Likewise, the second end Ea 101 registers with the second end Sa 101 (FIG. 23); the second end Ea 102 registers with the second end Sa 102, and so forth. Therefore, as shown in FIGS. 21 to 24, the means for connecting a line wire attached to terminal E 101 consist, in the following order, of: the corresponding pre-shaped conducting element 111, the second end Eb 101, the registering second end Sb 101, the pre-shaped conducting element 121 corresponding to this last-mentioned second end Sb 101 and the output terminal S 101. A line comprising two wires, the means for connecting the second wire attached to the input terminal E 111 consist, in the following order, of: the corresponding pre-shaped conducting element 122, the second end Ea 101, the registering second end Sa 101, the pre-shaped conducting element 112 corresponding to this last-mentioned second end Sa 101, and the output terminal 111. The other line wires are connected in the same way.

It will be seen that with the above-described form of embodiment of the connecting unit or block according to this invention, the two wires of a line are broken between the relevant input and output terminals when no external connecting means are utilized. Now such external connecting means are advantageously incorporated in a "function" and/or "protection" module. The plug-in terminals of a module 106 of this type are illustrated in FIGS. 23 and 24 of the drawings. They are adapted to bear against the corresponding first faces 201' and 202' of the insulating supports 201 and 202. Thus, FIG. 23 illustrates the plug-in terminals 136 which, when the module 160 is plugged-in in the direction of the arrow 137, engages the second ends Ea 101 and Sa 101 so that these ends are interconnected either directly or through the medium of protection means, such as a fuse or a lightning arrester (not shown). Likewise, FIG. 24 shows plugin terminals 138 which, when the module 160 is plugged-in in the direction of the arrow 137, co-operates similarly with the second ends Eb 101 and Sb 101 in order to interconnect them.

In addition, each pair of insulating supports 201, 202 comprises a ground circuit section consisting of a conducting strip 140 disposed for example between the second faces 201" and 202", respectively, parallel to the third side 133, one side 141 of each strip 140 being substantially co-planar or aligned with this third side 133. All the conducting strips incorporated in the ground circuit of the connecting unit are kept parallel to one another by a metal support to which they are rigidly secured. In this example, this metal support consists of a metal armature or frame 142 disposed along the third side 133 of the insulating supports constituting the connecting unit. These strips 140 are rigidly fastened to the armature or frame 142 at the two ends of their side 141. Each insulating support 201 comprises a row of notches 143 passing through it and opening into its third side 133 registering with the relevant strip 140. In this example, this notch or clearnce 143 is located, along the third side 133 of the insulating support 201 between the second end of each pre-shaped conducting element connected to an input terminal intended for a first line wire and the second end of the pre-shaped conductor connected to the output terminal intended for the second wire of the same line. In this assembly, the second ends of the pre-shaped conductors do not co-operate directly with the strips 140 of the ground circuit, but they co-operate therewith through the medium of a module 160 of the type already described in the foregoing; as shown in fragmentary view in FIG. 25, each module 160 is plugged-in in the direction of the arrow 137 and penetrates into one of the notches 143 lying in its path, so as to contact the corresponding strip 140.

As shown in FIGS. 18 to 22, the stacked assembly of pairs of insulating supports 201, 202 is held in position by a U-shaped armature 91. The two wings 92 and 93 of this armature 91 have their outer edges fastened to the upper and lower ports 142' and 142", respectively, of frame 142. Each ground circuit strip 140 constitutes a slideway for the third side of a pair of insulating supports 201, 202. At least one end of these strips is free to permit the insertion of the pairs of insulating supports in the direction of the arrow 145 (see FIGS. 18, 20, 21 and 22). The fourth side 134 opposite to the third side 133 of each pair of insulating supports 201, 202 is also slidably mounted between the ribs 91' of armature 91. As in the first form of embodiment, the two wings 92 and 93 of this armature 91 have holes formed therein for receiving with a slight clearance the pivot pins 94 and 95, respectively, rigid with brackets 96 and 97 fastened in turn to a trough 98 in which the cable 6 is housed. The pivot pins 94 and 95 provide for the complete connecting unit a pivot axis 99 which, in this example, is substantially vertical and disposed at the same location as in the form of embodiment shown in FIGS. 1 and 2.

As illustrated in FIG. 22, in the gap left between the insulating supports 201, 202 a plurality of channels 148 disposed side by side are formed between the ribs 147 projecting from the second face 202" of insulating support 202 on the portion of said second face which does carry any conducting elements. Each channel 148 opens at a first end 148' in the vicinity of the input terminals E 101, E 111, for example, which corresponds to the two wires of a same line, and at its second end 148" on the fourth side 134 of the insulating supports. Each channel 148 is adapted to contain the two wires 5 of a same line emerging from the cable 6, said wires being connected to the input terminals E 101 and E 111 in this example. An aperture 98' is formed in trough 98 to permit the passage of the wires 5. On the other hand, as illustrated in FIG. 21, in the same space provided between the two insulating supports 201, 202 constituting a pair of said supports, a plurality of channels 100 similar to those illustrated in FIG. 5 are provided. These channels 100 are disposed side by side between the ribs 4 formed on the second face 201" of the insulating support 201, against the portion of this second face which is free of any conducting element. Each channel 100 opens at a first end 101 in the vicinity of the output terminals, for example S 101 and S 111, corresponding to the two wires of a same line, and at its other end 102 on the fourth side 134 of the stacked insulating supports. Each channel 100 is adapted to contain the two wires 103, 104 of the previously cited line, these wires being connected to the corresponding output terminals, S 101 and S 111 in this example. The wire end projecting from the second ends of channels 100 are retained in a grommet or wire-guide device 105. It will be seen (FIG. 22) that the first ends of channels 148 open on the side 131 of the second face 202" of the insulating support 202 opposite to the side 132 supporting the output terminals S 101 to S 107 disposed on the same second face 202". Similarly (FIG. 21) the channels 100 have their first ends 101 opening on the side 132 of the second face 201" of insulating support 201 opposite the side 131 supporting the input terminals E 101 to E 107 disposed on the same second face 201".

In a first modified version of the form of embodiment disclosed hereinabove, and as shown in FIGS. 26 and 27, the second ends, such as Ea 101 and Eb 101, of the pre-shaped conducting elements connected to input terminals are not rectilinear but comprise a bent portion 149 constantly tending to resiliently engage the ground strip 140 through notches or clearances 150 extending through the corresponding insulating elements denoted 202 and 201, respectively. These notches or clearances 150 do not open on the third side 133 of the insulating supports. The second ends terminate with a beak 151 diverging slightly from the first face 202' and 201', respectively, of the relevant insulating support. The corresponding second ends Sa 101 and Sb 101 are unchanged. When no module is plugged in, the electrical continuity between the second ends Ea 101-Sa101 and Eb 101-Sb 101 connected to the corresponding input and output terminals is discontinued, and the input terminals are connected to the strip 140 via the second ends Ea 101 and Eb 101. When a protection and/or function module is plugged-in in the direction of the arrow 137, the conducting pins 152 and 153 thereof move the strip 140 away from the second ends Ea 101 and Sb 101. Thus, the electrical continuity between the input and output terminals of each of the two line wires is obtained through this module.

In a second version of the preceding form of embodiment (FIGS. 18 to 25), illustrated in FIGS. 28 and 29, the second ends Ea 101 and Eb 101 are identical with those of the first modified form of embodiment (FIGS. 26 and 27). The second ends Sa 101 and Sb 101 each connected to an output terminal are shaped like Ea 101 and Eb 101, respectively. The strip 140 is replaced by another, narrower, strip 140' to permit the contact between the second end Ea 101 and the second end Sa 101, and to enable the second end Eb 101 to engage the second end Sb 101. When no module is plugged in, the electrical continuity is thus provided between each input terminal and the corresponding output terminal. When a protection module is pluggedin in the direction of the arrow 137, its four conducting terminal, identical with the preceding terminals 152, move the four second ends Ea 101, Sa 101, Eb 101 and Sb 101 away from each other, and the electrical continuity between each input terminal and each corresponding output terminal is provided by the protection means contained in the module. If the module thus plugged in is a function module, its four terminals are insulated and break the electrical continuity between each input terminal and each relevant output terminal.

Figure 30:
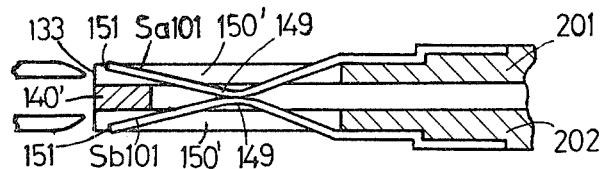
FIGS. 30 and 31 illustrate in fragmentary sections similar to those taken along the lines XXIII—XXIII and XXIV—XXIV, respectively, of a third modified version of the same second form of embodiment.
Figure 31:
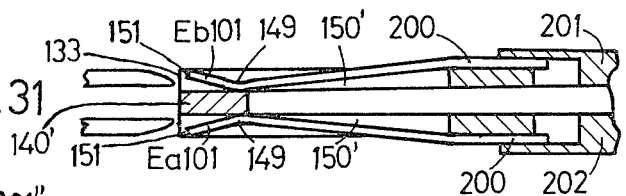

In a third version of the preceding form of embodiment (FIGS. 18 to 25), illustrated in FIGS. 30 and 31, the second ends Ea 101 and Eb 101 each connected to an input terminal are disposed in face-to-face relationship and their portions 149 contact the strip 140'; similarly, the second ends Sa 101 and Sb 101 each connected to a separate output terminal are disposed in front of each other and their portions 149 contact each other. To facilitate these contacts, the notches or clearances 150 are replaced by apertures 150' opening on the third side 133 of insulating supports 201, 202. Thus, when no module is plugged in, the electrical continuity is broken between the input terminal and the output terminal of each wire, the input terminal being grounded and the output terminals of the two wires of a same line are looped. If desired modules similar to those utilized in the second version described hereinabove may be used.

Figure 32:
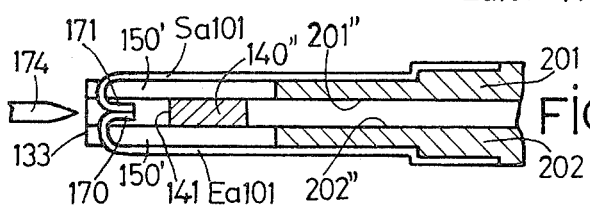
FIGS. 32 and 33 illustrate in fragmentary sections similar to those taken along the lines XXIII—XXIII and XXIV—XXIV, respectively, of a fourth modified version of the same second form of embodiment.
Figure 33:
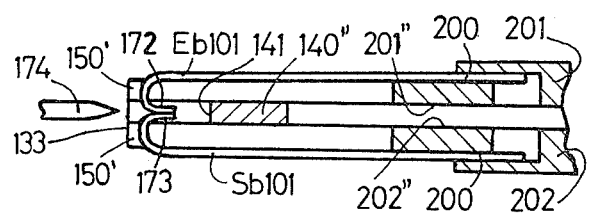

In a fourth modified embodiment (FIGS. 32 and 33) of the preceding structure shown in FIG. 18 to 25, all the second ends are bent to make an angle of approximately 180° towards the second faces of their relevant insulating supports, and received in notches or clearances 150' and also in the gap existing between said second faces 202" and 201". The bent portion 170 of the second end Ea 101 contacts the bent portion 171 of the second end Sa 101 registering therewith. Likewise, the bent portion 172 of the second end Eb 101 contacts the bent portion 173 of the second end Sb 101. The ground strip 140" in this example is received in the gap formed between the two insulating supports 201, 202 but its side 141 is somewhat recessed in relation to the third side 133 to free the space necessary for the bent portions 170 to 173. When no module is plugged in, the electrical continuity is provided between the input terminal and the output terminal of each line wire. This continuity may be broken for example by the plug-in insulating terminals 174 of a function module.

Figure 34:
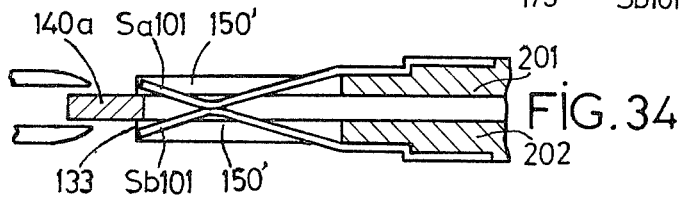
FIGS. 34 and 35 illustrate in fragmentary section taken along the lines XXIII—XXIII and XXIV—XXIV, respectively, a fifth modified version of the same second form of embodiment.
Figure 35:
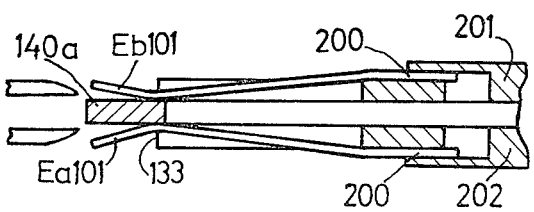

In a fifth version of the preceding form of embodiment (FIGS. 18 to 25), illustrated in FIGS. 34 and 35, the ground circuit strips 140a are each located in front of the gap separating the two insulating supports 201, 202 and extend for their greater part outside the third side 133 of said supports, along said third side. All the other component elements are identical with those illustrated in FIGS. 30 and 31.

Figure 36:
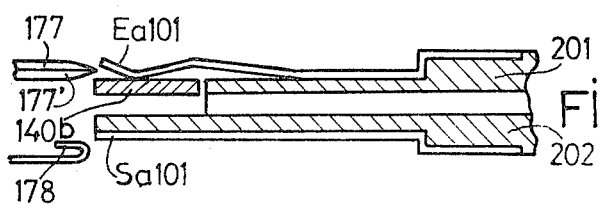
FIGS. 36 and 37 illustrate in fragmentary section taken likewise along the lines XXIII—XXIII and XXIV—XXIV, respectively, a sixth modified version of the same second form of embodiment of the invention.
Figure 37:
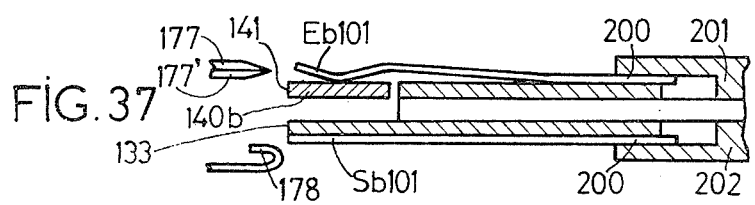

In a sixth version of the preceding form of embodiment (FIGS. 18 to 25), illustrated in FIGS. 36 and 37, each ground circuit strip 140b extends along the third side 133 of the insulating supports and constitutes an extension of insulating support 201, and its side 141 is aligned with the third side 133. In this alternate version, the second ends Ea 101 and Eb 101 are disposed side by side on the insulating support 201 and contact the ground circuit strip 140b. The second ends Sa 101 are rectilinear and disposed side by side, in front of the preceding ones, respectively, on insulating support 202. When no module is present, the electrical continuity is broken between each input terminal and the relevant output terminal, and the input terminals are grounded. The electrical continuity may be established by means of a module comprising conducting terminals 177 adapted to co-operate with the second ends Ea 101 and Eb 101, and conducting terminals 178 adapted to co-operate with the second ends Sa 101 and Sb 101. The terminals 177 comprise each an insulating portion 177' adapted to insulate each of them from the ground strip 140b.

Figure 38:
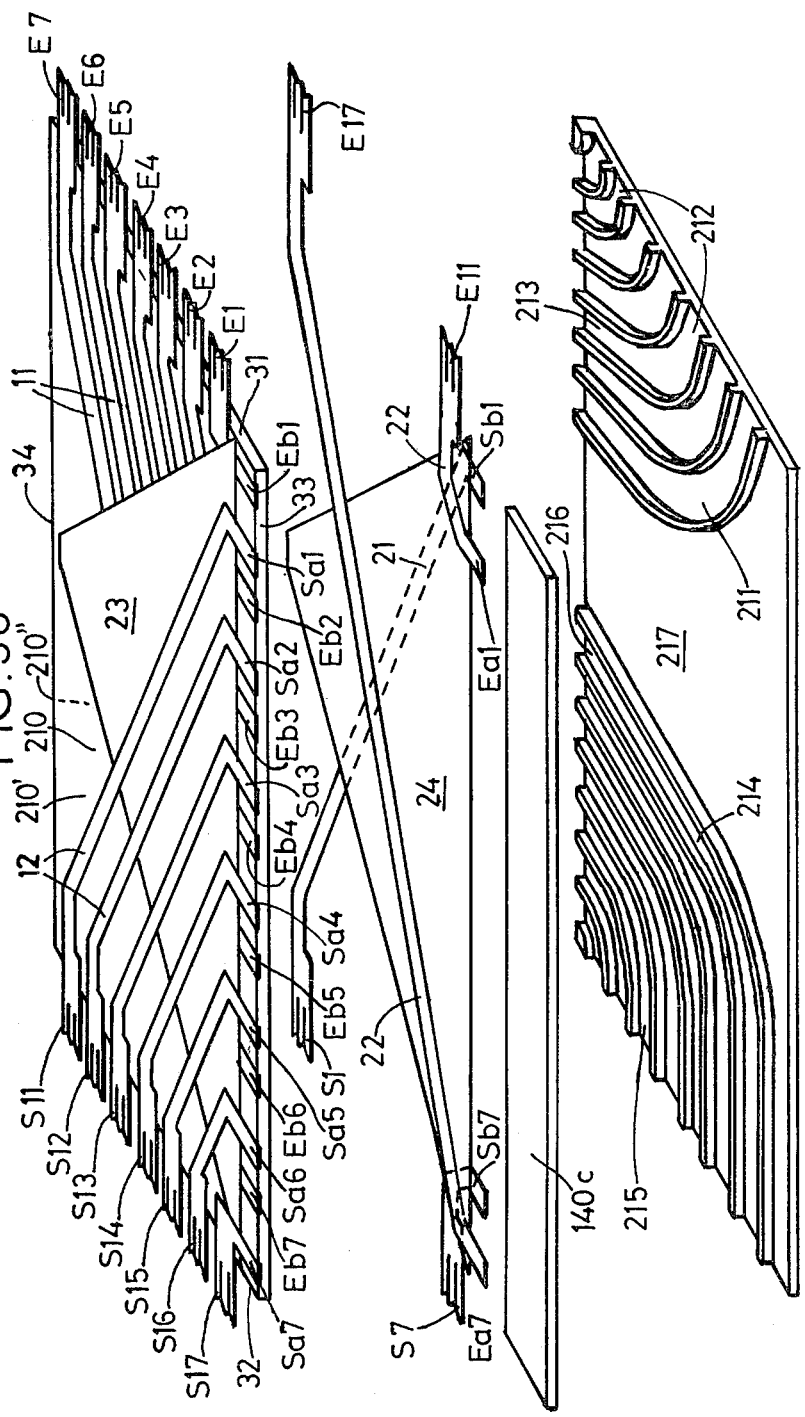
FIG. 38 illustrates in fragmentary perspective and exploded view a third form of embodiment of the invention.

In the third form of embodiment of the connecting unit illustrated in fragmentary view in FIG. 38 the insulating supports are not co-operating by pairs as in the above-described versions; however they are stacked and kept at a relative spacing from one another. Each insulating support 210 comprises pre-shaped conducting elements disposed on each one of its opposite faces 210' and 210". The pre-shaped conducting elements supported by the second face 201" are for example similar to those supported by the first face of the second insulating support 2, as illustrated in FIG. 5. Only the pre-shaped conducting element corresponding to input terminals E and to output terminals S denoted 11 and 17, 1 and 7, are illustrated in FIG. 38, on the second face 210".

In contrast to the second ends of the pre-shaped conducting elements of the first form of embodiment, those of the present form of embodiment are not bent but, for example, rectilinear or simply broken in the vicinity of the third side 33 of the insulating support 210.

FIG. 38 illustrates by way of example the junction of the wires connected to the input terminals E1 to E11 and E7 to E17. It will be seen that in this example the first and second pre-shaped conducting element of a same line wire are disposed the one on the first face 210' and the other on the second face 210" of the insulating support 210. On the other hand, some of the pre-shaped conducting elements 11, 12 on the one hand, 21, 22 on the other hand, cross each other on a same face of the insulating support 210. These elements are insulated by means of insulating elements consisting for example of thin insulating plates of suitable plastics material; thus, an insulating plate 23 is disposed between the pre-shaped conducting elements 11 and 12, and another insulating plate 24 is disposed between the pre-shaped conducting elements 21 and 22.

According to a modified version applicable to this form of embodiment, a ground circuit strip 140c is disposed for example along, and parallel to, the third side 33 of insulating support 210, so as to constitute an extension of this insulating support 210.

In the gap left between two adjacent insulating supports 210, two groups of channels disposed substantially in a common plane parallel to the insulating supports 210 are provided. A first group of channels 211 open at a first end 212 in the vicinity of the input terminals provided on the side 31 of the insulating support 210, and at their second ends 213 on the fourth side 34 of this insulating support which is substantially opposite the third side 33. A second group of channels 214 opens at a first end 215 in the vicinity of the output terminals provided on the side 32 of the same support 210, and at their other end 216 on the fourth side 34. These channels may consist for example of the ribs supported by an insulating plate 217.

All the other component elements are identical with those of the second form of embodiment (FIGS. 18 to 25). The line wires are connected in the same manner as explained in the foregoing.

With the above-described elements it is possible to break the electrical continuity between each input terminal and the corresponding output terminal. As in the preceding form of embodiment (FIGS. 18 to 25) it is possible, by plugging-in a function module and/or protection module, to restore at will said electrical continuity.

The connecting unit according to this invention may be utilized whenever required for connecting a great number of line wires within the smallest possible volume.

What is claimed is:

1. A connecting unit for dispatchers systems comprising junction means for a plurality of line wires, said means comprising a plurality of stacked insulating supports of generally rectangular shape with first and second sides opposite one another and third and fourth sides opposite one another and disposed at right angles to said first and second sides, first and second pre-shaped conducting elements forming inserts in said stacked insulating supports, first ends of said first pre-shaped conducting elements comprising input terminals at the first side of said stacked insulating supports for connection with said line wires, first ends of said second pre-shaped conducting elements comprising output terminals at the second side of said stacked insulating supports, and the second ends of said first and second pre-shaped conducting elements terminating at the third side of said stacked insulating supports in position to cooperate with a plug-in module, and at least one plug-in module cooperating with said second ends of said pre-shaped conducting element.

2. A connecting unit as claimed in claim 1, wherein said stacked insulating supports co-operate by pairs, the insulating supports of each pair being kept in spaced relationship to each other with a gap therebetween and comprising first faces respectively, opposite to each other, and second faces opposite to said faces and in face-to-face relationship with each other, said first and second pre-shaped conducting elements of a same line wire being located on the first face of one of said insulating supports of the pair concerned, the corresponding second ends of the two pre-shaped conducting elements which correspond to the same line wire being bent to an angle of about 180° towards the other face of the relevant insulating support and received in said gap separating the second faces, respectively, of the two insulating supports of the pair concerned, and an insulating element being disposed between said first and second pre-shaped conducting elements supported by the first face of each insulating support.

3. A connecting unit as claimed in claim 1, wherein said stacked insulating supports co-operate by pairs, the insulating supports of each pair being kept in spaced relationship and comprising first faces opposite to each other, and second faces opposite to the first faces, which are in face-to-face relationship with each other, the first and second pre-shaped conducting elements of a same line wire being disposed on a common insulating support, one on a first face and the other on a second face thereof.

4. A connecting unit as claimed in claim 1, wherein said stacked insulating supports co-operate by pairs, the insulating supports of each pair being kept in spaced relationship with each other and comprising first faces opposite to each other, and second faces opposite to said first faces and in face-to-face relationship with each other, the first and second pre-shaped conducting elements respectively of a same line wire being located on a common insulating support, one on a first face and the other on a second face thereof, the second ends respectively of the two pre-shaped conducting elements corresponding to the same line wire being bent at an angle of approximately 180° towards the second face of their relevant insulating support, and received in the gap left between the second faces of the two insulating supports constituting one pair of supports.

5. A connecting unit as claimed in claim 4, wherein said second end of the pre-shaped conducting elements supported by the second face of each insulating support constituting one pair of said supports extends through the relevant insulating support in the vicinity of the third side of said insulating support for contacting the first face thereof.

6. A connecting unit as claimed in claim 1, wherein said insulating supports are kept in a predetermined spaced relationship from each other, the first and second pre-shaped conducting elements of a same line wire being located both on the first face of one insulating support, an insulating element being interposed between the first and second pre-shaped conducting elements supported by a same face of said insulating support.

7. A connecting unit as claimed in claim 6, further comprising a ground circuit adapted to co-operate with predetermined second ends of said first pre-shaped conducting elements, one portion of said ground circuit being disposed along the third side of the insulating supports constituting each pair of said supports.

8. A connecting unit as claimed in claim 7, wherein said ground circuit portion lies between the second faces of the insulating supports constituting one pair of said supports.

9. A connecting unit as claimed in claim 8, wherein said ground circuit portion bears against the second face of one of the insulating supports constituting one pair of said supports, and registers with said second ends of said pre-shaped conducting elements.

10. A connecting unit as claimed in claim 7, wherein said ground circuit portion is located substantially in alignment with one of said insulating supports constituting a pair of said supports so as to constitute substantially an extension of said insulating support.

11. A connecting unit as claimed in claim 7, wherein said ground circuit portion registers in face-to-face relationship with the gap separating the two insulating supports constituting one pair of said supports, and projects from the third side of said supports.

12. A connecting unit as claimed in claim 9, wherein said ground circuit portion comprises extensions located on said second face of one of said insulating supports constituting one pair of supports, the end portions of said extensions extending towards but not touching the second ends of said second pre-shaped conducting elements.

13. A connecting unit as claimed in claim 12, wherein at least one of said insulating supports constituting one pair of said supports comprises at least one opening extending through it and opening on its fourth side in the vicinity of the second ends of said pre-shaped conducting elements, in front of the corresponding portion of said ground circuit, in order to permit the passage of a conducting plug-in portion adapted to co-operate with said ground circuit, said plug-in portion being provided on at least one of said modules.

14. A connecting unit as claimed in claim 13, wherein at least one of the two insulating supports constituting one pair of said supports comprises at least one opening extending through it and opening on its third side registering with the second ends of said pre-shaped conducting elements, to permit the passage of said second ends respectively towards the corresponding second ends located on the other insulating support of the same pair of supports.

15. A connecting unit as claimed in claim 12, further comprising a signal conducting circuit comprising a conducting plate disposed against the second face of that one of said insulating supports of each pair which does not carry said ground circuit, said plate having extensions bent at an angle of about 180° towards the first face of the same insulating support, said extensions being disposed in face-to-face relationship with respect to said bent extensions of said ground circuit, each pair of said bent extensions registering with each other and being adapted to co-operate with a pair of terminals of a protection module comprising protection means contained in said module and a device for detecting a faulty condition of said protection means, said device being adapted to provide an electrical connection between said two terminals in case of faulty operation of said protection means.

16. A connecting unit as claimed in claim 2, wherein, in the gap left between the two stacked insulating supports constituting one pair of said supports, there are provided a plurality of channels disposed side by side, said channels opening at a first end in the vicinity of the output terminals of said second pre-shaped conducting elements and at their second end on a fourth side of said insulating supports, which is substantially opposite said third side.

17. A connecting unit as claimed in claim 5, wherein, a plurality of channels are provided in the gap between two stacked insulating supports constituting one pair of said supports on one portion of the second face of at least one of said supports, said one portion being free of any pre-shaped conducting element, said channels being disposed side by side and opening at a first end on the side of said second face of said support which is opposite the side supporting said input and output terminals, and at their second end on a fourth side of said insulating support, which is substantially opposed to said third side.

18. A connecting unit as claimed in claim 6, wherein two groups of channels disposed substantially in a same plane parallel to said insulating supports are provided in the space between two adjacent insulating supports, said two groups of channels opening at their first ends in close vicinity of the two opposite sides of said insulating supports which support the input terminals and the output terminals, and at their second ends on a fourth side of said insulating supports, which is substantially opposite to said third side.

19. A connecting unit as claimed in claim 11, further comprising a metal frame comprising at least one metal support holding said ground circuit portions parallel to each other, at least one of the ends of said portions being free so that each portion of said ground circuit constitutes a slideway for the third side of a pair of insulating supports.

20. A connecting unit as claimed in claim 1, wherein said stacked insulating supports cooperate in pairs, the insulating supports of each pair being kept in spaced relationship to each other with a gap therebetween and comprising first faces respectively opposite to each other and second faces opposite to said first faces, which register in face-to-face relationship with each other, said first and second pre-shaped conducting elements of a same line wire being located respectively on said first faces of said insulating supports of the pair concerned, the corresponding second ends of the two pre-shaped conducting elements which correspond to the same line wire being bent at an angle of about 180° towards the second face of the relevant insulating support and received in said gap separating said second faces, respectively, of the two insulating supports of the pair concerned.

21. A connecting unit as claimed in claim 1, wherein said stacked insulating supports cooperate in pairs, the insulating supports of each pair being kept in spaced relationship and comprising first faces opposite to each other and second faces opposite to the first faces which register in face-to-face relationship with each other, the first and second pre-shaped conducting elements of a same line wire being disposed one on one of the faces of one of the insulating supports of a pair and the other on one of the faces of the other insulating support of a pair.

22. A connecting unit as claimed in claim 1, wherein said stacked insulating supports cooperate by pairs, the insulating supports of each pair being kept in spaced relationship with each other and comprising first faces opposite to each other and second faces opposite to said first faces and registering in face-to-face relationship with each other, the first and second pre-shaped conducting elements of a same line wire being located respectively on said first face of one insulating support of a pair and on said first face of the other insulating support of a pair, the second ends respectively of the two pre-shaped conducting elements corresponding to the same line wire being bent at an angle of about 180° toward the second faces of their relevant insulating support and received in the gap left between the second faces of the two insulating supports constituting a pair of supports.

23. A connecting unit as claimed in claim 1, wherein said insulating supports are kept in a predetermined spaced relationship from each other, the first and second pre-shaped conducting elements of a same line wire being located one on the first face and the other on the second face of one insulating support.

24. A connecting unit as claimed in claim 19, wherein said ground circuit portion comprises extensions bent at an angle of about 180° toward the first face of the same insulating support.

25. A connecting unit as claimed in claim 9, wherein said ground circuit comprises extensions bent towards the second face of the other insulating support of a pair of said supports.

26. A connecting unit as claimed in claim 13, wherein at least one of the two insulating supports constituting one pair of said supports comprises at least one opening extending through it and opening on its third side in front of the relevant portion of said ground circuit to permit the passage of said second ends respectively toward corresponding second ends located on the other insulating support of the same pair of supports.

27. A connecting unit as claimed in claim 15, further comprising a source of current and a signal module having terminals adapted to be plugged-in in the same plane as the protection module, said signal module comprising signal means connected in series between one of said terminals on said source of current.

28. A connecting unit as claimed in claim 1, wherein said at least one plug-in module is a protection module including a fuse.

29. A connecting unit as claimed in claim 1, wherein said at least one plug-in module is a function module comprising switching means.

* * * * *